(12) United States Patent
Tani

(10) Patent No.: US 7,148,640 B2
(45) Date of Patent: Dec. 12, 2006

(54) VALVE CONTROLLER

(75) Inventor: Hideji Tani, Hashima-gun (JP)

(73) Assignee: Denso Corporation, Kariya (JP)

( * ) Notice: Subject to any disclaimer, the term of this patent is extended or adjusted under 35 U.S.C. 154(b) by 36 days.

(21) Appl. No.: 11/060,724

(22) Filed: Feb. 18, 2005

(65) Prior Publication Data

US 2005/0179414 A1    Aug. 18, 2005

(30) Foreign Application Priority Data

Feb. 18, 2004    (JP) .............................. 2004-042047

(51) Int. Cl.
*H02P 1/00* (2006.01)
*F01L 1/34* (2006.01)

(52) U.S. Cl. .................. 318/280; 318/445; 123/90.15; 123/90.17

(58) Field of Classification Search ................ 318/138, 318/245, 254, 685, 727, 434; 123/399, 90.15, 123/90.17
See application file for complete search history.

(56) References Cited

U.S. PATENT DOCUMENTS

| | | | |
|---|---|---|---|
| 5,447,133 A * | 9/1995 | Kamio et al. ................ 123/396 |
| 5,463,298 A * | 10/1995 | Kamio et al. ................ 318/599 |
| 5,606,950 A * | 3/1997 | Fujiwara et al. ............. 123/399 |
| 5,828,193 A * | 10/1998 | Furuta ......................... 318/254 |
| 5,832,395 A * | 11/1998 | Takeda et al. ................. 701/22 |
| 5,855,195 A * | 1/1999 | Oikawa et al. .......... 123/339.25 |
| 6,274,993 B1 * | 8/2001 | Itabashi et al. .............. 318/432 |
| 6,291,955 B1 * | 9/2001 | Itabashi et al. .............. 318/434 |
| 6,293,249 B1 * | 9/2001 | Kuretake ..................... 123/399 |
| 6,494,181 B1 * | 12/2002 | Kuretake ..................... 123/399 |
| 6,502,548 B1 * | 1/2003 | Kuretake ..................... 123/399 |
| 6,561,162 B1 * | 5/2003 | Kuretake ..................... 123/399 |
| 6,637,391 B1 * | 10/2003 | Muraki et al. ............ 123/90.17 |
| 6,781,341 B1 * | 8/2004 | Nakamichi et al. ......... 318/685 |
| 6,837,217 B1 * | 1/2005 | Hoshino et al. ............. 123/399 |
| 6,874,471 B1 * | 4/2005 | Hoshino et al. ............. 123/399 |
| 2001/0015196 A1 * | 8/2001 | Marumoto et al. ......... 123/399 |
| 2001/0019252 A1 * | 9/2001 | Watanabe ..................... 318/727 |
| 2001/0039940 A1 * | 11/2001 | Kuretake ..................... 123/399 |
| 2002/0134352 A1 * | 9/2002 | Kuretake ..................... 123/399 |
| 2002/0139348 A1 * | 10/2002 | Kuretake ..................... 123/399 |
| 2003/0218443 A1 * | 11/2003 | Nakamichi et al. ......... 318/685 |
| 2005/0092295 A1 * | 5/2005 | Hoshino et al. ............. 123/399 |

FOREIGN PATENT DOCUMENTS

| | | |
|---|---|---|
| JP | 4-105906 | 9/1992 |
| JP | 8-317679 | 11/1996 |
| JP | 11-324625 | 11/1999 |

* cited by examiner

*Primary Examiner*—Paul Ip
(74) *Attorney, Agent, or Firm*—Nixon & Vanderhye, P.C.

(57) ABSTRACT

The invention provides a valve controller of a motor utilizing type for improving control accuracy and reducing cost. The valve controller controls valve opening and closing of an engine by utilizing rotation torque of the motor, and has a driving circuit receiving a control signal generated by a control circuit, and applying an electric current to the motor and driving the motor on the basis of a target rotation number of the motor shown by this control signal using a frequency, and a target rotating direction of the motor shown by this control signal using a duty ratio.

27 Claims, 31 Drawing Sheets

NORMAL
Duty: $R_1 = t_H/T * 100$

REVERSE
Duty: $R_2 = t_H/T * 100$

FIG. 11A
REF CLOCK SIG
FIG. 11B
INVERTED CTRL SIG
FIG. 11C
CTRL SIG
Duty:$R_1$ (NORMAL)
FIG. 11D
COUNT NUMBER
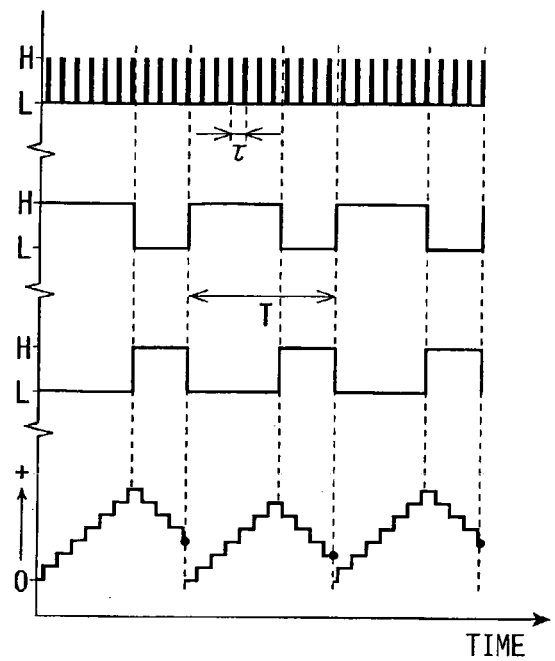
FIG. 12A
REF CLOCK SIG
FIG. 12B
INVERTED CTRL SIG
FIG. 12C
CTRL SIG
Duty:$R_2$ (REVERSE)
FIG. 12D
COUNT NUMBER
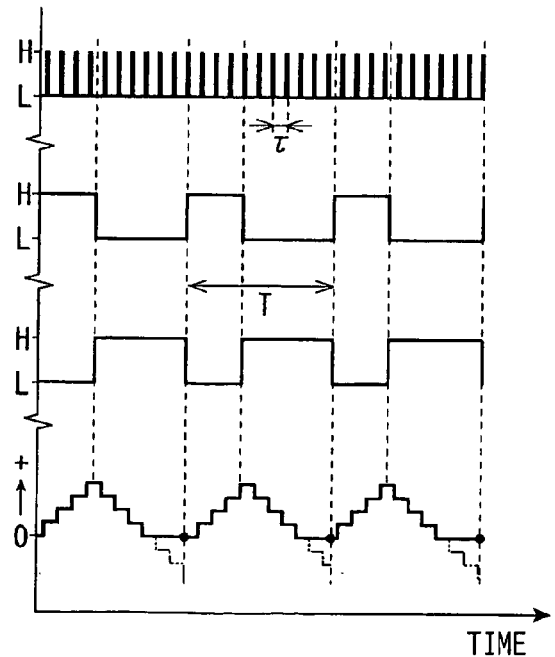

REF CLOCK SIG

INVERTED CTRL SIG

1st AND GATE OUTPUT SIG

CTRL SIG
Duty:$R_1$ (NORMAL)

2nd AND GATE OUTPUT SIG

COUNT NUMBER

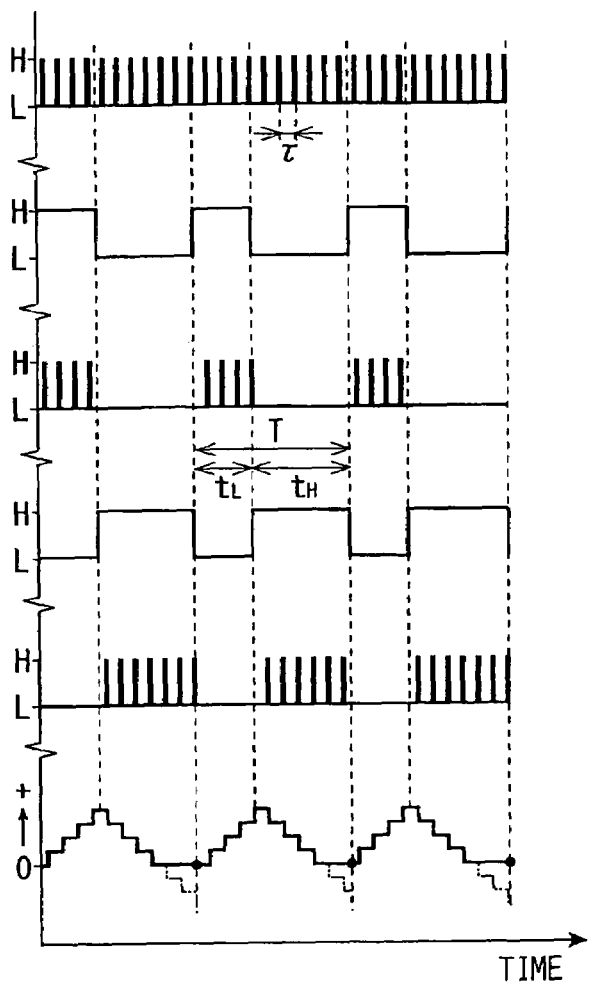
FIG. 15A REF CLOCK SIG
FIG. 15B INVERTED CTRL SIG
FIG. 15C 1st AND GATE OUTPUT SIG
FIG. 15D CTRL SIG Duty:$R_2$ (REVERSE)
FIG. 15E 2nd AND GATE OUTPUT SIG
FIG. 15F COUNT NUMBER

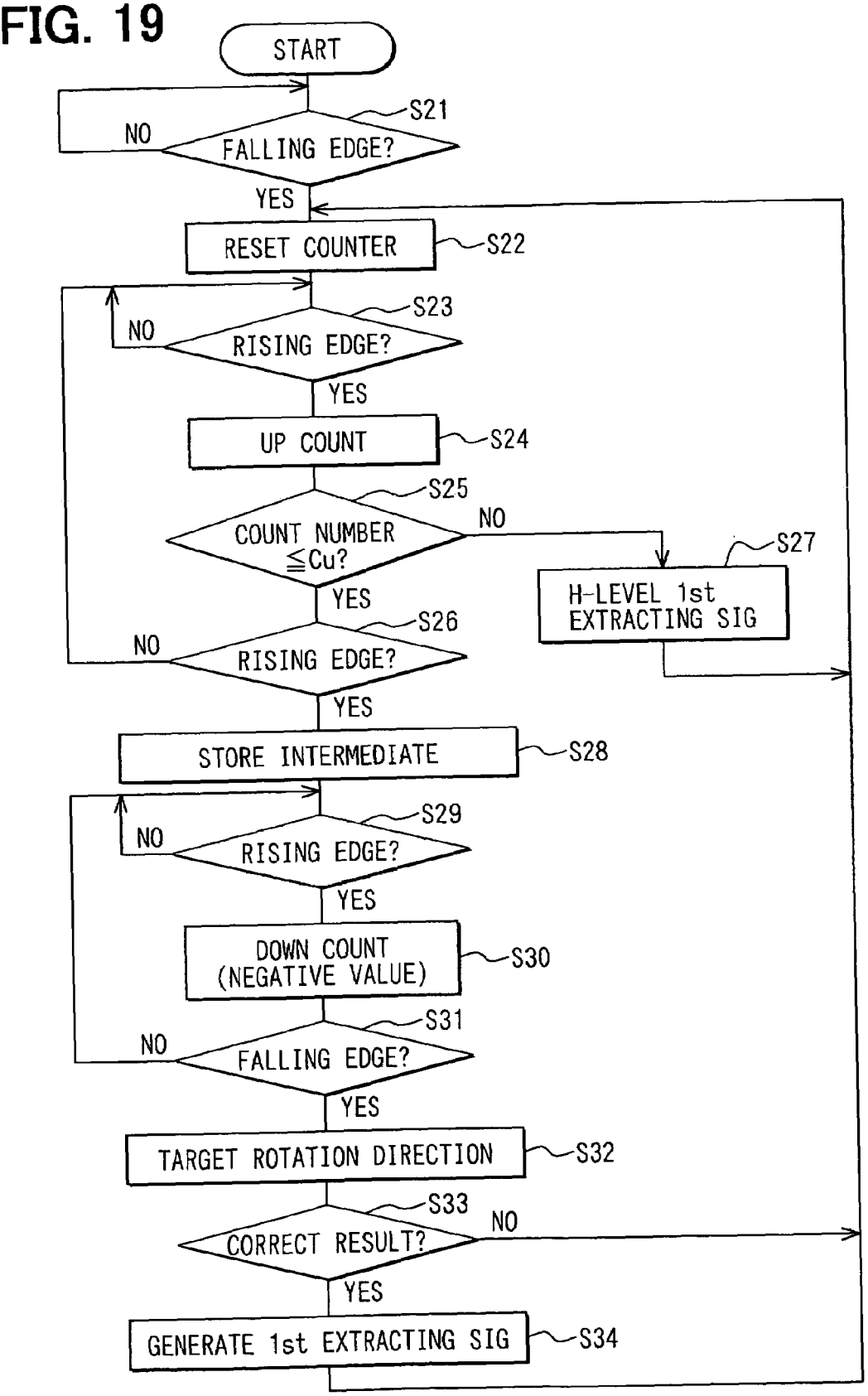

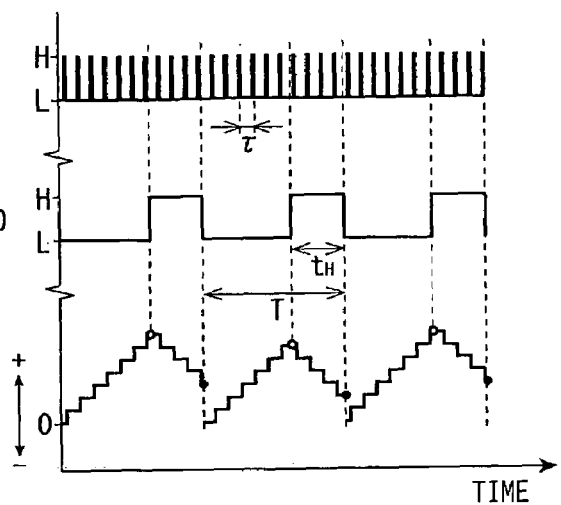
FIG. 20A REF CLOCK SIG
FIG. 20B CTRL SIG
Duty: $R_1=t_H/T*100$
(NORMAL)
FIG. 20C COUNT NUMBER
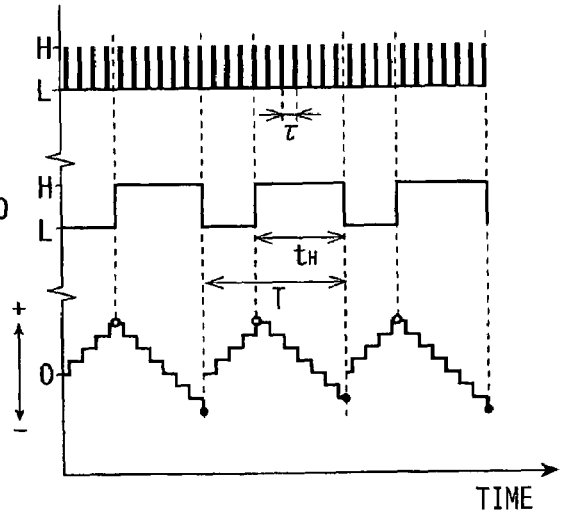
FIG. 21A REF CLOCK SIG
FIG. 21B CTRL SIG
Duty: $R_2=t_H/T*100$
(REVERSE)
FIG. 21C COUNT NUMBER

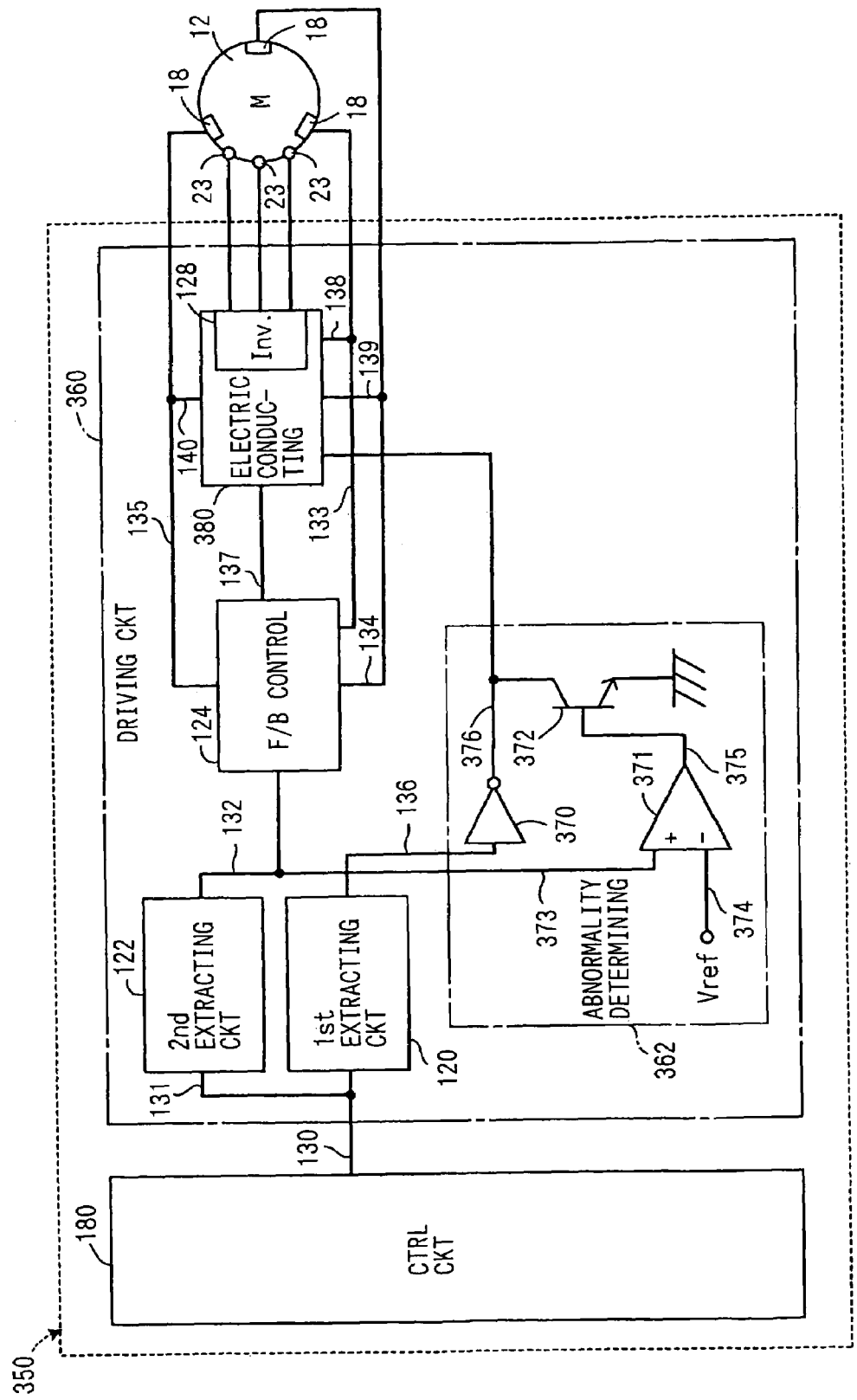

FIG. 23A  1st EXTRACTING SIG (BEFORE INVERSION)
FIG. 23B  INVERTED 1st EXTRACTING SIG
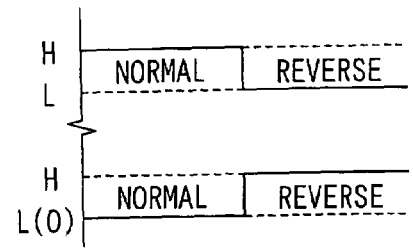
FIG. 24A
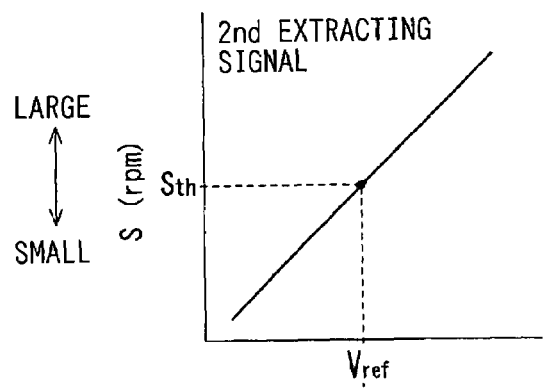
FIG. 24B
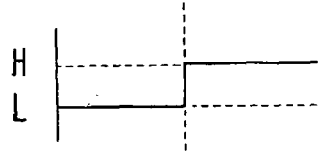

FIG. 26A COMPARATOR OUTPUT SIG
FIG. 26B INVERTED 1st EXTRACTING SIG
FIG. 26C AND GATE OUTPUT SIG
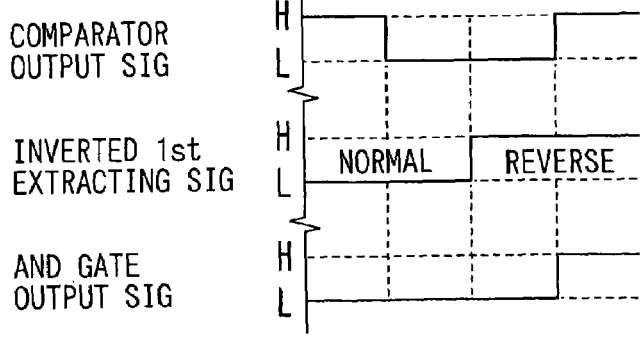
FIG. 29A
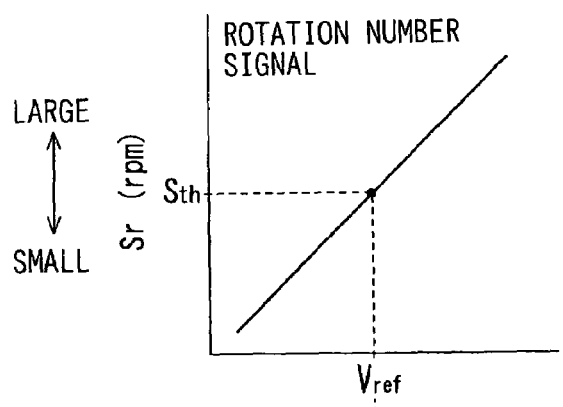
FIG. 29B COMPARATOR OUTPUT SIG
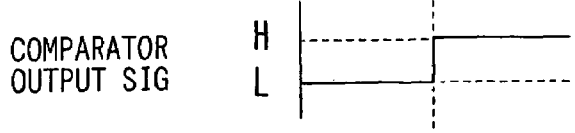

NORMAL·P-CTRL
Duty: $r_1 = t_H/T * 100$

NORMAL·PI-CTRL
Duty: $r_2 = t_H/T * 100$

REVERSE·P-CTRL
Duty: $r_3 = t_H/T * 100$

REVERSE·PI-CTRL
Duty: $r_4 = t_H/T * 100$

FIG. 35A
REF CLOCK SIG
FIG. 35B
CTRL SIG
Duty: $r_1 = t_H/T * 100$
(NORMAL·P-CTRL)
FIG. 35C
COUNT NUMBER
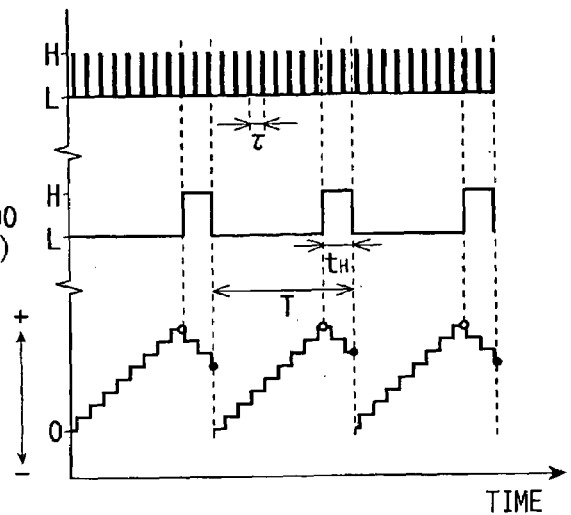
FIG. 36A
REF CLOCK SIG
FIG. 36B
CTRL SIG
Duty: $r_2 = t_H/T * 100$
(NORMAL·PI-CTRL)
FIG. 36C
COUNT NUMBER
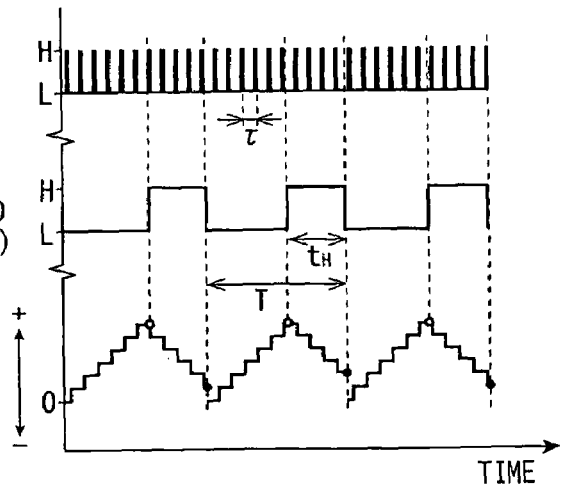

FIG. 37A
REF CLOCK SIG
FIG. 37B
CTRL SIG
Duty: $r_3 = t_H/T * 100$
(REVERSE·P-CTRL)
FIG. 37C
COUNT NUMBER
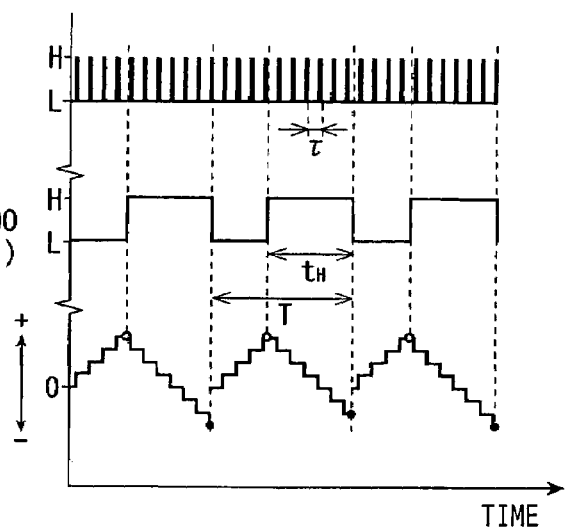
FIG. 38A
REF CLOCK SIG
FIG. 38B
CTRL SIG
Duty: $r_4 = t_H/T * 100$
(REVERSE·PI-CTRL)
FIG. 38C
COUNT NUMBER
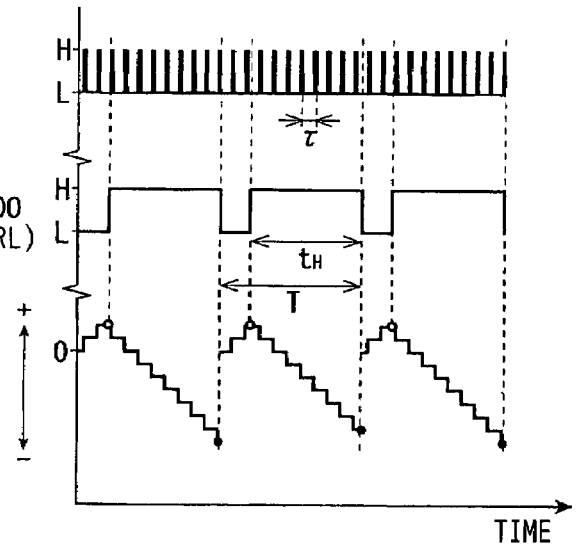

NORMAL·1st GAIN
Duty: $r_1 = t_H/T * 100$

NORMAL·2nd GAIN
Duty: $r_2 = t_H/T * 100$

REVERSE·1st GAIN
Duty: $r_3 = t_H/T * 100$

REVERSE·2nd GAIN
Duty: $r_4 = t_H/T * 100$

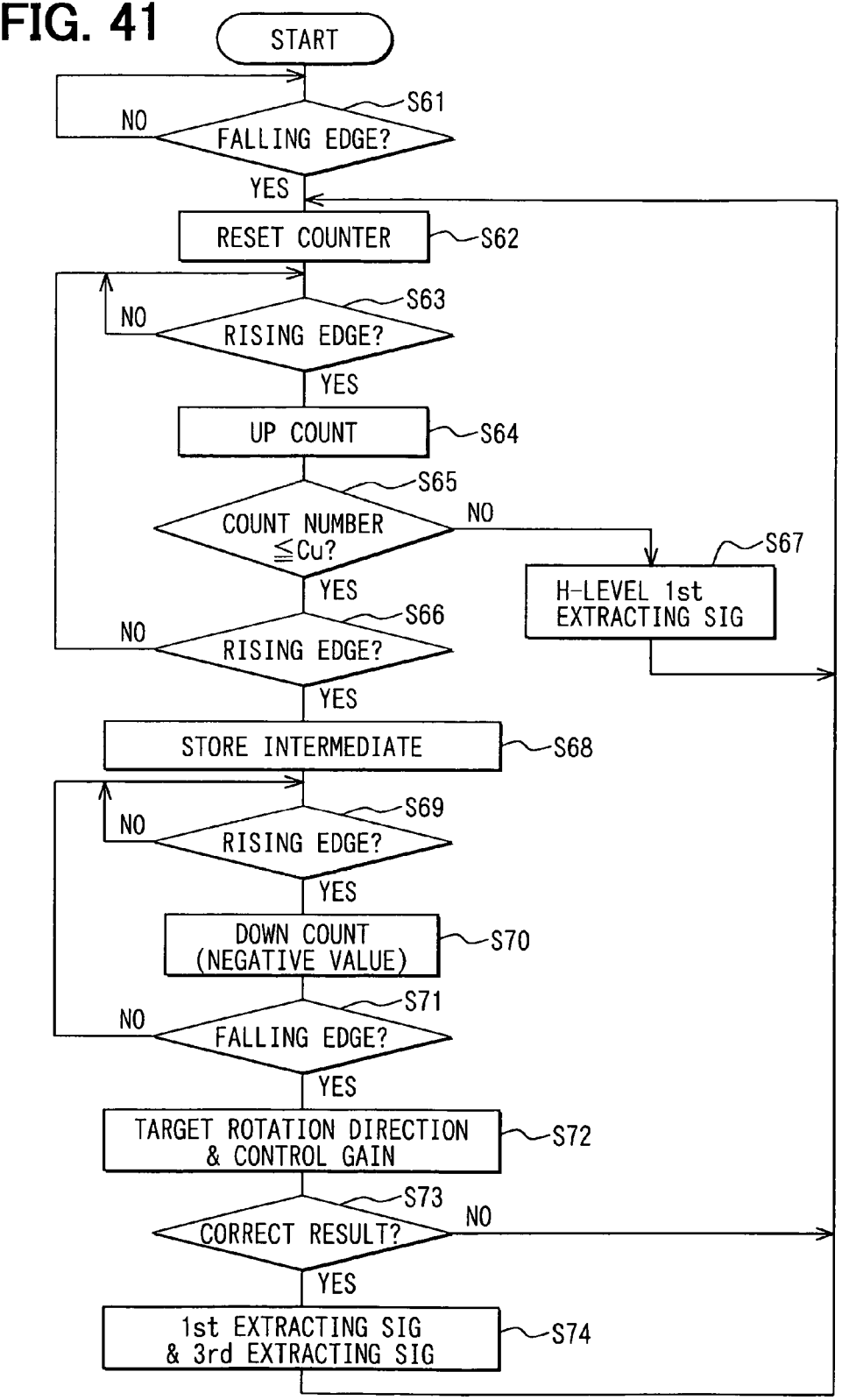

VALVE CONTROLLER

CROSS-REFERENCE TO RELATED APPLICATION

This application is based on Japanese Patent Application No. 2004-042047 filed on Feb. 18, 2004, the disclosure of which is incorporated herein by reference.

FIELD OF THE INVENTION

The present invention relates to a valve controller for controlling valve opening and closing of an engine by utilizing rotation torque of a motor.

BACKGROUND OF THE INVENTION

JP-U-4-105906A shows a device for adjusting valve timing of the engine by utilizing the rotation torque of the motor. JP-11-324625A shows a device for adjusting a valve lift of the engine by utilizing the rotation torque of the motor.

In the valve opening-closing controller of such a motor utilizing type, a driving circuit for receiving a signal generated by a control circuit is used and electric conduction according to this receiving signal is executed with respect to the motor. For example, a method for separating a signal showing a target rotation number of the motor and a signal showing a target rotating direction of the motor and transmitting the signals from the control circuit to the driving circuit is conventionally considered. In accordance with such a method, information shown by each signal is limited to one. Therefore, the target rotation number shown by the former signal particularly becomes a high value in resolution. Since the resolution of the target rotation number becomes high in such a way, control accuracy of the valve opening and closing is improved.

However, when the signal showing the target rotation number and the signal showing the target rotating direction are separated, a signal line is required every each of these signals, which prevents a reduction in cost.

SUMMARY OF THE INVENTION

An object of the invention is to provide a valve controller of the motor utilizing type for reconciling the improvement of the control accuracy and the reduction in cost.

In accordance with the invention, a driving circuit applies an electric current to a motor and drives the motor on the basis of a target rotation number of the motor (hereinafter, simply called a target rotation number) shown by a control signal generated by a control circuit using a frequency, and a target rotating direction of the motor (hereinafter, simply called a target rotating direction) shown by this control signal using a duty ratio. Here, the frequency can be set with a large degree of freedom on the axis of time. Accordingly, resolution of the target rotation number shown by the control signal using the frequency can be raised. Furthermore, since the frequency and the duty ratio can be respectively independently set, two information constructed by the target rotation number and the target rotating direction can be accurately represented by one control signal. Accordingly, the number of signal lines can be reduced since it is not necessary to divide signals into a signal showing the target rotation number and a signal showing the target rotating direction.

As mentioned above, in accordance with the invention, cost can be reduced by reducing the number of signal lines while control accuracy is improved by raising the resolution of the target rotation number.

BRIEF DESCRIPTION OF THE DRAWINGS

FIG. 11A to 11D are characteristic views for explaining the operation of the first extracting section in accordance with the first embodiment.

FIG. 12A to 12D are characteristic views for explaining the operation of the first extracting section in accordance with the first embodiment.

FIG. 15A to 15F are characteristic views for explaining the operation of the first extracting section in accordance with the second embodiment.

FIG. 19 is a flow chart for explaining the operation of the first extracting section in accordance with the fourth embodiment.

FIG. 20A to 20C are characteristic views for explaining the operation of the first extracting section in accordance with the fourth embodiment.

FIG. 21A to 21C are characteristic views for explaining the operation of the first extracting section in accordance with the fourth embodiment.

FIG. 22 is a block diagram showing a motor controller in accordance with a fifth embodiment.

FIGS. 23A and 23B are characteristic views for explaining a first extracting signal and an inverted first extracting signal generated in the fifth embodiment.

FIGS. 24A and 24B are characteristic views for explaining a second extracting signal and an output signal of a comparator generated in the fifth embodiment.

FIG. 26A to 26c are characteristic views for explaining an output signal of a comparator, an inverted first extracting signal and an output signal of an AND gate generated in the sixth embodiment.

FIGS. 29A and 29B are characteristic views for explaining a rotation number signal and an output signal of a comparator generated in the eighth embodiment.

FIG. 35A to 35C are characteristic views for explaining the operation of the first extracting section in accordance with the eleventh embodiment.

FIG. 36A to 36C are characteristic views for explaining the operation of the first extracting section in accordance with the eleventh embodiment.

FIG. 37A to 37C are characteristic views for explaining the operation of the first extracting section in accordance with the eleventh embodiment.

FIG. 38A to 38C are characteristic views for explaining the operation of the first extracting section in accordance with the eleventh embodiment.

FIG. 41 is a flow chart for explaining the operation of a first extracting section in accordance with the twelfth embodiment.

DESCRIPTION OF THE PREFERRED EMBODIMENTS (First Embodiment)

Figure 2:
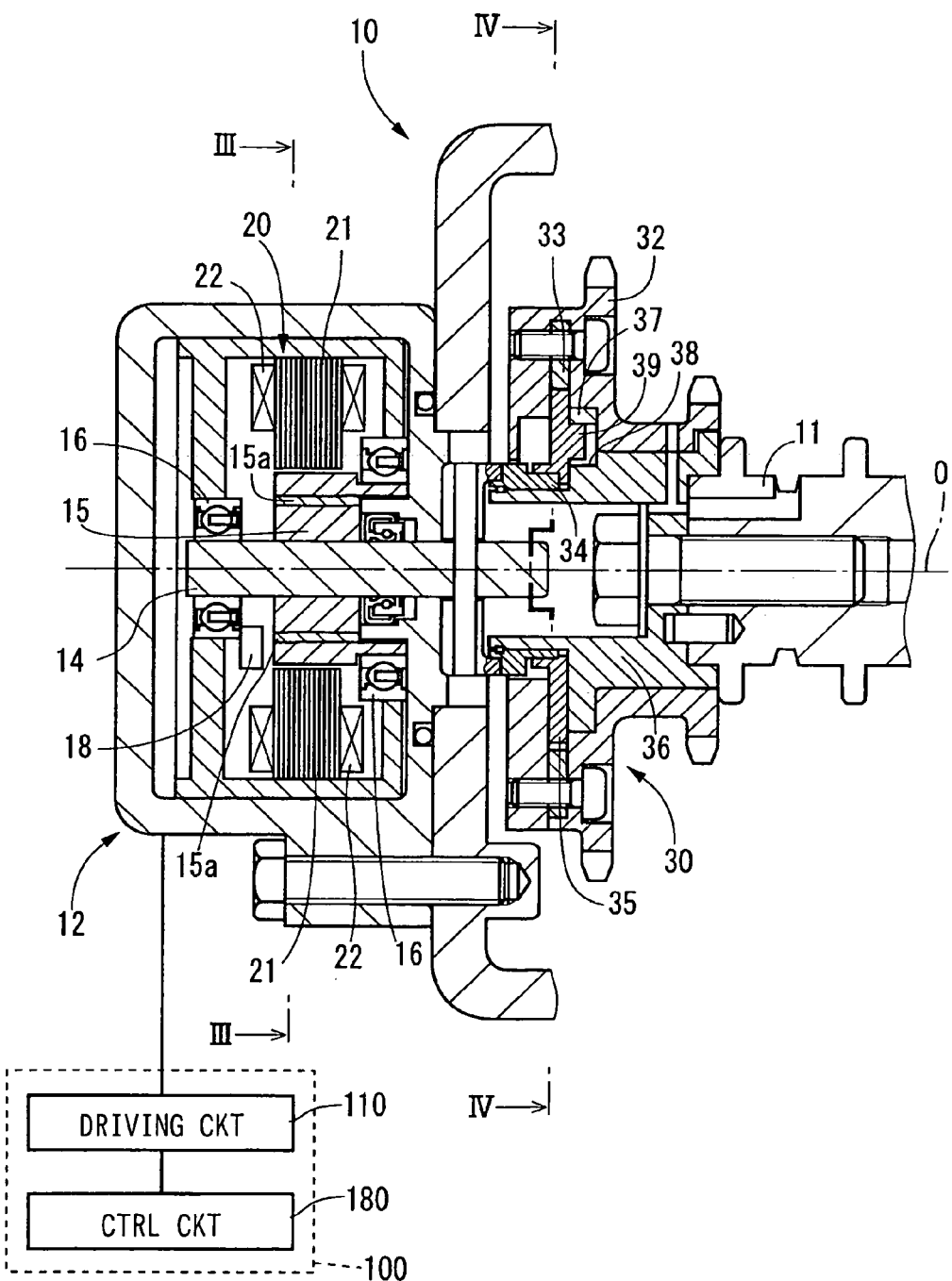
FIG. 2 is a cross-sectional view showing a valve timing-adjusting device in accordance with the first embodiment.
Figure 3:
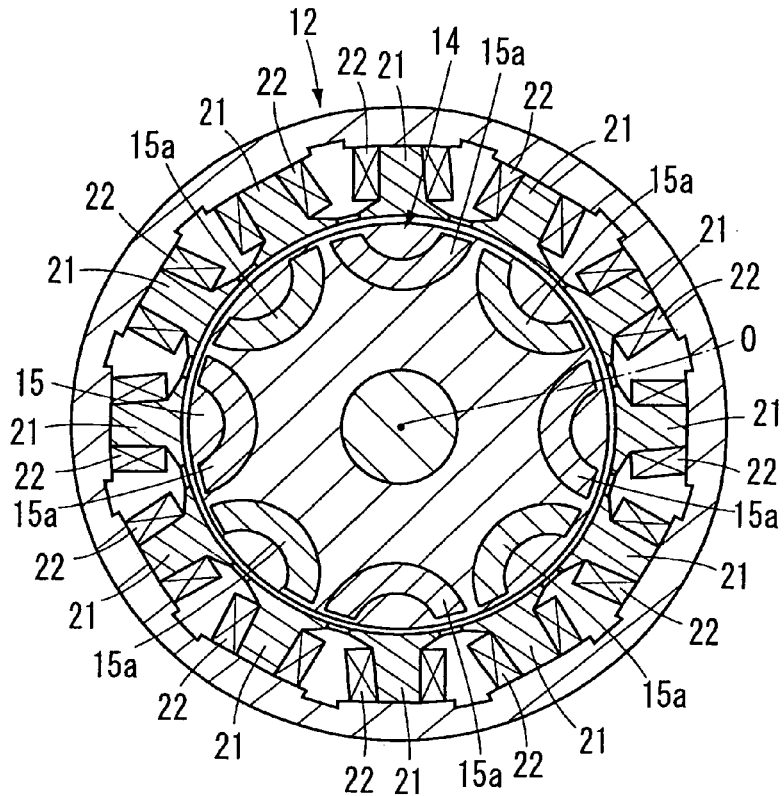
FIG. 3 is a cross-sectional view taken along line III—III of FIG. 2.
Figure 4:
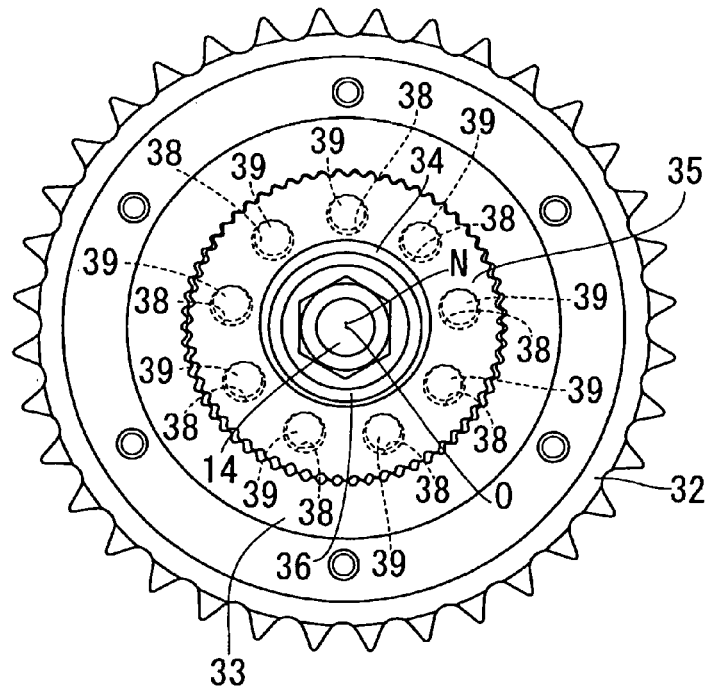
FIG. 4 is a cross-sectional view taken along line IV—IV of FIG. 2.

A valve timing adjusting device as a valve opening-closing controller in accordance with a first embodiment of the invention is shown in FIGS. 2 to 4. The valve timing adjusting device 10 is mounted to a vehicle, and is arranged in a transmission system for transmitting driving torque of a crank shaft of an engine to a cam shaft 11 of the engine. The valve timing adjusting device 10 adjusts valve timing of the engine by controlling valve opening and closing of the engine by utilizing rotation torque of a motor 12 controlled by a motor controller 100.

As shown in FIGS. 2 and 3, the motor 12 of the valve timing adjusting device 10 is a three-phase motor constructed by a motor shaft 14, a bearing 16, a Hall element 18, a stator 20, etc.

The motor shaft 14 is supported by two bearings 16, and can be rotated in the normal and reverse directions around the axis O. In this embodiment, the clockwise direction of FIG. 3 among the rotating directions of the motor shaft 14 is set to the normal rotating direction, and the counterclockwise direction of FIG. 3 is set to the revere rotating direction. In the motor shaft 14, a rotor portion 15 of a disk shape projected from the shaft main body to the diametrical outside is formed, and eight magnets 15a are buried in the rotor portion 15. Each magnet 15a is arranged at an equal interval around the axis O, and the magnets 15a adjacent to each other in the rotating direction of the motor shaft 14 are set to be reverse to each other with respect to magnetic poles formed on the outer circumferential wall side of the rotor portion 15. Three Hall elements 18 are arranged near the rotor portion 15. Each Hall element 18 is arranged at an equal interval around the axis O. The voltage of a detecting signal is raised and lowered when the magnet 15a forming the N-pole on the outer circumferential wall side of the rotor portion 15 is located within a predetermined angle range and is not located within the predetermined angle range.

Figure 5:
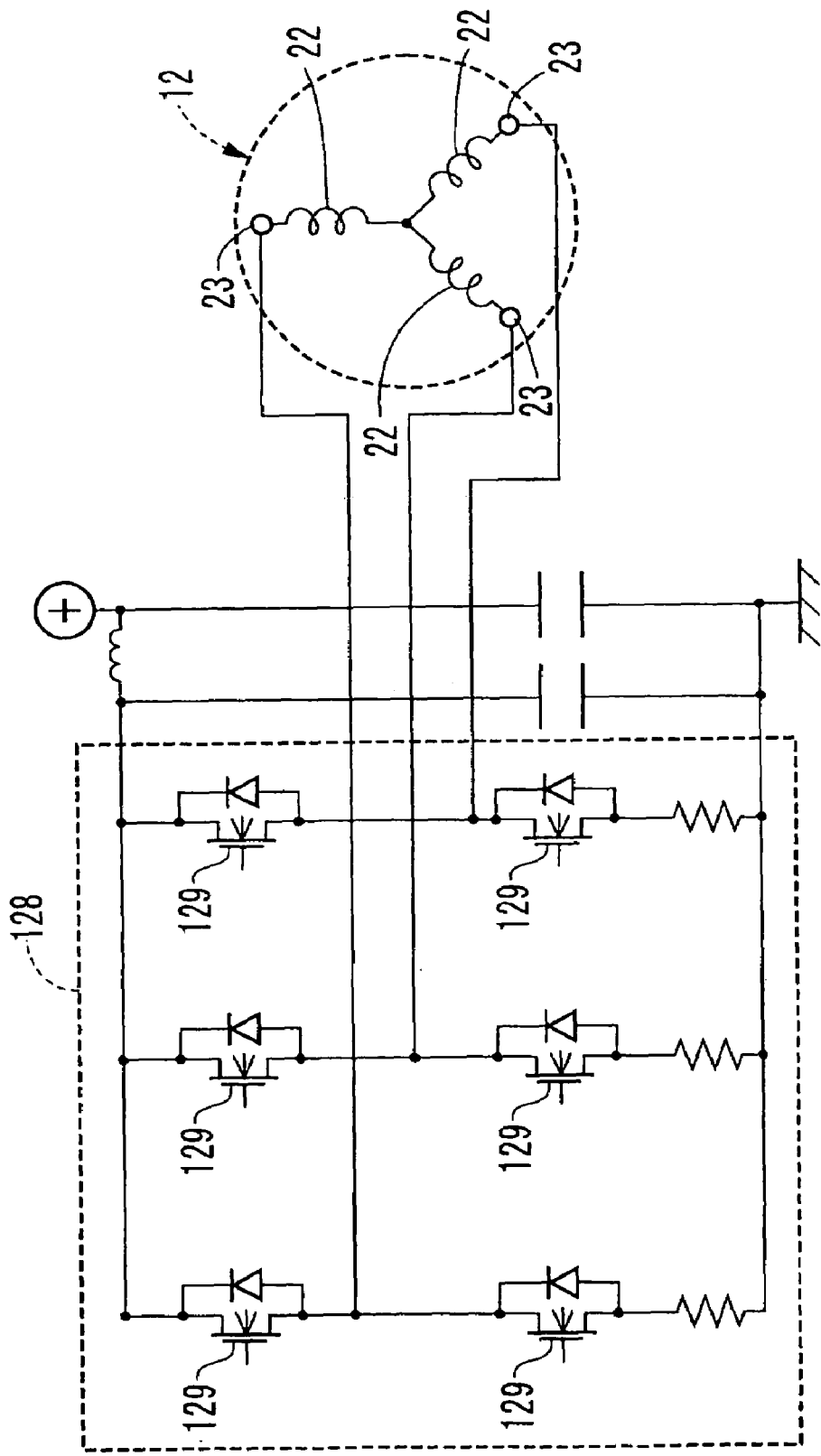
FIG. 5 is a circuit diagram showing a main portion of an electric conducting section in accordance with the first embodiment.

The stator 20 is arranged on the outer circumferential side of the motor shaft 14. Twelve cores 21 of the stator 20 are arranged at an equal interval around the axis O, and winding 22 is wound around each core 21. For example, as shown in FIG. 5, three windings 22 are star-connected as one set, and a terminal 23 connected to the non-connecting side is connected to the motor controller 100. In each winding 22 electrically conducted by the motor controller 100, a rotating magnetic field in the clockwise direction or the counterclockwise direction of FIG. 3 is formed on the outer circumferential side of the motor shaft 14. When the rotating magnetic field of the clockwise direction of FIG. 3 is formed, the magnet 15a receives an interaction within this magnetic field and the rotation torque of the normal rotating direction is given to the motor shaft 14. Similarly, when the rotating magnetic field of the counterclockwise direction of FIG. 3 is formed, the rotation torque of the reverse rotating direction is given to the motor shaft 14.

As shown in FIGS. 2 and 4, a phase changing mechanism 30 of the valve timing adjusting device 10 is constructed by a sprocket 32, a ring gear 33, an eccentric shaft 34, a planetary gear 35, an output shaft 36, etc., and is operated by the motor 12.

The sprocket 32 is coaxially arranged on the outer circumferential side of the output shaft 36, and can be relatively rotated around the same axis O as the motor shaft 14 with respect to the output shaft 36. When the driving torque of the crankshaft is inputted to the sprocket 32 through a chain belt, the sprocket 32 is rotated in the clockwise direction of FIG. 4 with the axis O as a center while a rotating phase with respect to the crankshaft is held. Namely, the sprocket 32 functions as a rotating body rotated in synchronization with the crankshaft. The ring gear 33 is constructed by an internal gear and is coaxially fixed to the inner circumferential wall of the sprocket 32, and is rotated integrally with the sprocket 32.

The eccentric shaft 34 is eccentrically arranged with respect to the axis O by connecting and fixing this eccentric shaft 34 to the motor shaft 14, and can be rotated integrally with the motor shaft 14. The planetary gear 35 is constructed by an external gear, and is arranged so as to make a planetary movement on the inner circumferential side of the ring gear 33 such that one portion of plural teeth is engaged with one portion of plural teeth of the ring gear 33. The planetary gear 35 coaxially supported in the outer circumferential wall of the eccentric shaft 34 can be relatively rotated around an eccentric axis N with respect to the eccentric shaft 34. The output shaft 36 is coaxially fixed to the camshaft 11 by a bolt, and is rotated integrally with the camshaft 11 with the same axis O as the motor shaft 14 as a center. An engaging portion 37 of an annular plate shape with the axis O as a center is formed in the output shaft 36. Nine engaging holes 38 are arranged at an equal interval around the axis O in the engaging portion 37. Engaging projections 39 are projected in the planetary gear 35 from nine portions opposed to the respective engaging holes 38. The respective engaging projections 39 are arranged at an equal interval around the eccentric axis N, and are projected into the corresponding engaging holes 38.

When no motor shaft 14 is relatively rotated with respect to the sprocket 32, the planetary gear 35 is integrated with the sprocket 32 and is rotated in the clockwise direction of FIG. 4 while holding an engaging position with the ring gear 33 as the crank shaft is rotated. At this time, since the engaging projection 39 presses against the inner circumferential wall of the engaging hole 38 in the rotating direction, the output shaft 36 is not relatively rotated with respect to the sprocket 32, but is rotated in the clockwise direction of FIG. 4. Thus, since the rotating phase (hereinafter, simply called the rotating phase) of the camshaft 11 with respect to the crankshaft is held, no valve timing is changed. In contrast to this, when the motor shaft 14 is relatively rotated in the counterclockwise direction of FIG. 4 as its reverse rotating direction with respect to the sprocket 32, the engaging position with the ring gear 33 is changed while the planetary gear 35 is relatively rotated in the clockwise direction of FIG. 4 with respect to the eccentric shaft 34. At this time, since force for pressing the engaging hole 38 in the rotating direction by the engaging projection 39 is increased, the output shaft 36 is angularly advanced with respect to the sprocket 32. Thus, the rotating phase, in its turn, the valve timing is changed onto the angle advancing side. On the other hand, when the motor shaft 14 is relatively rotated in the clockwise direction of FIG. 4 as its normal rotating direction with respect to the sprocket 32, the engaging position with the ring gear 33 is changed while the planetary gear 35 is relatively rotated in the counterclockwise direction of FIG. 4 with respect to the eccentric shaft 34. At this time, since the engaging projection 39 presses against the engaging hole 38 in the revere rotating direction, the output shaft 36 is angularly delayed with respect to the sprocket 32. Thus, the rotating phase, in its turn, the valve timing is changed onto the retardation side.

The motor controller 100 will next be explained in detail. In the following explanation, the voltage of the high side set to a turning-on state is called a H-level and the voltage of the low side set to a turning-off state is called an L-level with respect to the voltages of various kinds of signals.

The motor controller 100 is constructed by a driving circuit 110, a control circuit 180, etc. In FIG. 2, the driving circuit 110 and the control circuit 180 are typically shown so as to be located in the exterior of the motor 12, but the respective arranging positions of the driving circuit 110 and the control circuit 180 can be suitably set. For example, the driving circuit 110 may be arranged within the motor 12, and the control circuit 180 may be arranged outside the motor 12. Further, for example, one portion of the driving circuit 110 may be also arranged within the motor 12, and the remaining portion of the driving circuit 110 and the control circuit 180 may be also arranged outside the motor 12.

Figure 1:
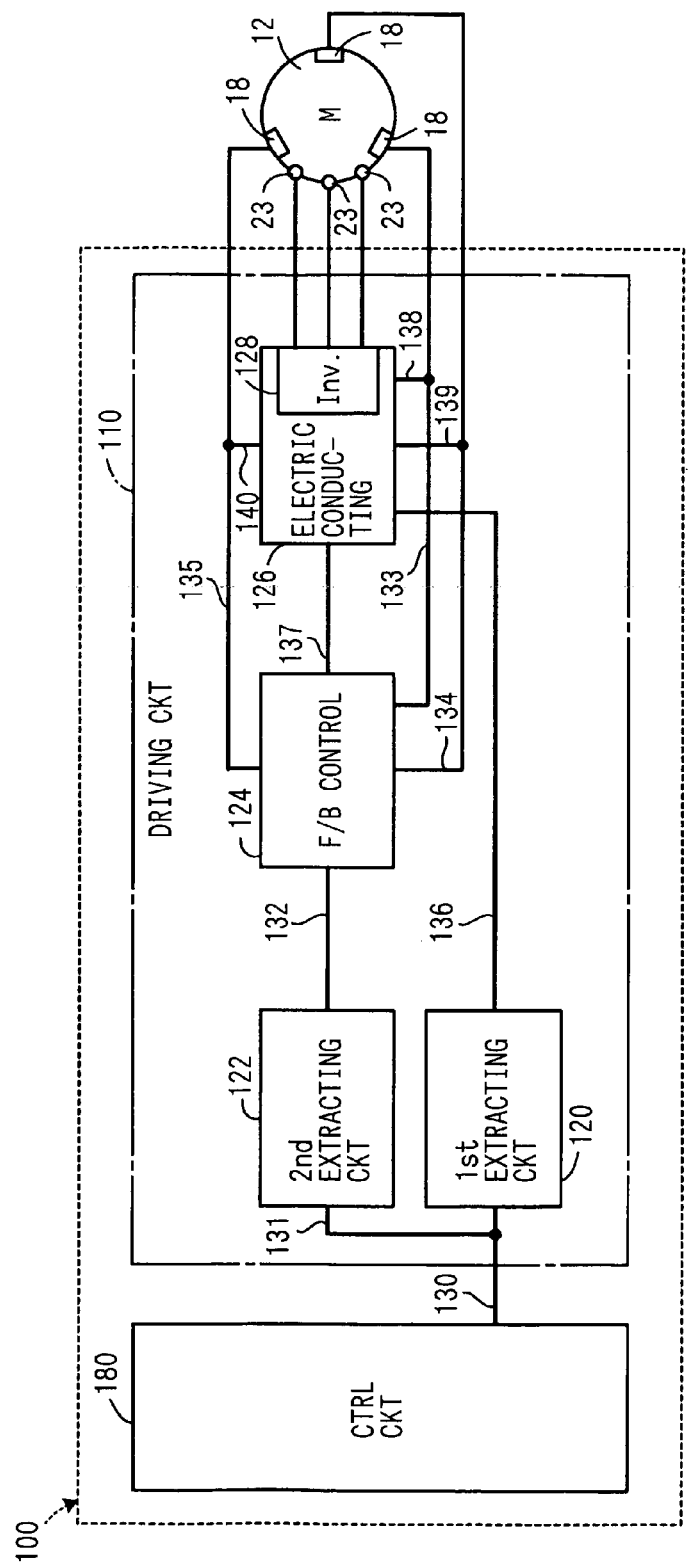
FIG. 1 is a block diagram showing a motor controller in accordance with a first embodiment.

The control circuit 180 controls electric conduction to the motor 12 using the driving circuit 110, and also controls the operation of the engine such as the operations of an igniter, a fuel injecting device, etc. Concretely, the control circuit 180 is constructed by an electronic circuit, and is connected to the driving circuit 110 as shown in FIG. 1. The control circuit 180 determines a target rotation number S of the motor shaft 14 and a target rotating direction D of the motor shaft 14 as control information for controlling the electric conduction to the motor 12. Here, the target rotation number S is a value having no sign showing the target rotating direction D, and shows an absolute value of the rotation number as a target. The control circuit 180 of this embodiment is connected to a sensor for detecting the rotation numbers of the crank shaft and the cam shaft 11, and determines the target rotation number S and the target rotating direction D required to hold or change the rotating phase on the basis of the rotation numbers of the crank shaft and the cam shaft 11, etc.

Figures 6A, 6B:
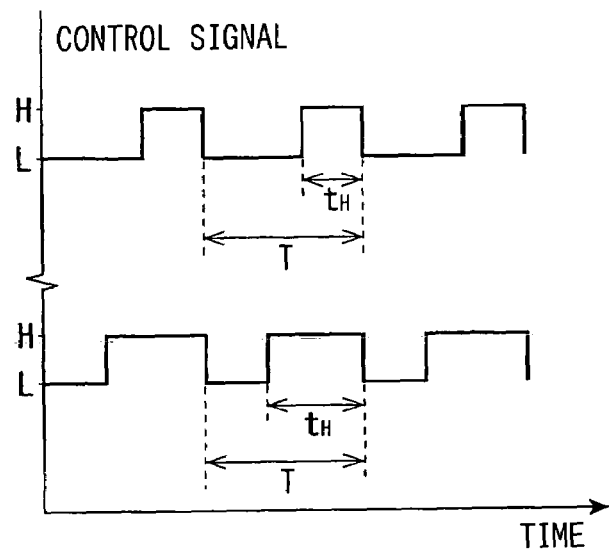
FIGS. 6A and 6B are characteristic views for explaining a control signal generated in the first embodiment.
Figure 7:
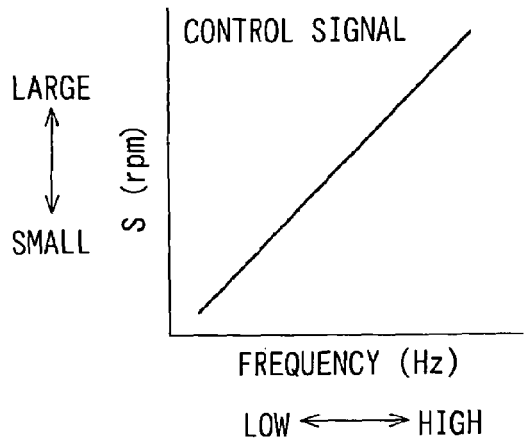
FIG. 7 is a characteristic view for explaining the control signal generated in the first embodiment.

The control circuit 180 generates a control signal showing the target rotation number S and the target rotating direction D thus determined by a frequency and a duty ratio, respectively. Here, the frequency of the control signal is the inverse number of a period T shown in FIG. 6, and is set so as to be proportional to the target rotation number S as shown in FIG. 7. Further, as shown in FIG. 6, the duty ratio of the control signal is the ratio of time $t_H$ in which the voltage is the H-level in one period T. This duty ratio is set so as to be different in magnitude in accordance with the normal and reverse directions of the target rotating direction D. In this embodiment, when the target rotating direction D is the normal rotating direction, the duty ratio of the control signal is set to a first reference area $R_1$ smaller than 50% as shown in FIG. 6A. When the target rotating direction D is the reverse rotating direction, the duty ratio of the control signal is set to a second reference area $R_2$ greater than 50% as shown in FIG. 6B. For example, the respective reference areas $R_1$ and $R_2$ are respectively set to 30% and 70%. With respect to the control signal, the duty ratio can be changed while constantly holding the frequency, and can be constantly held by changing the time $t_H$ having the H-level even when the frequency is changed. In short, each of the frequency and the duty ratio of the control signal can be independently set.

The driving circuit 110 applies an electric current to the motor 12 and drives the motor 12. Concretely, the driving circuit 110 is constructed by an electronic circuit, and has a first extracting section 120, a second extracting section 122, a feedback control section 124 and an electric conducting section 126 as shown in FIG. 1.

Figure 8:
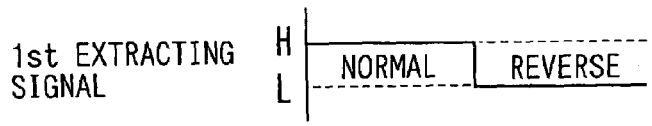
FIG. 8 is a characteristic view for explaining a first extracting signal generated in the first embodiment.

The first extracting section 120 is connected from the control-circuit 180 to a signal line 130 for transmitting the control signal. The first extracting section 120 extracts the target rotating direction D from control information shown by the received control signal, and generates a first extracting signal showing only the extracted target rotating direction D. The first extracting section 120 of this embodiment determines that the target rotating direction D is the normal rotating direction when the duty ratio of the control signal is smaller than 50%. The first extracting section 120 also determines that the target rotating direction D is the reverse rotating direction when the duty ratio of the control signal is greater than 50%. As shown in FIG. 8, the first extracting section 120 generates the first extracting signal showing the normal and reverse rotating directions of the determined target rotating direction D by high and low values of the voltage.

Figure 9:
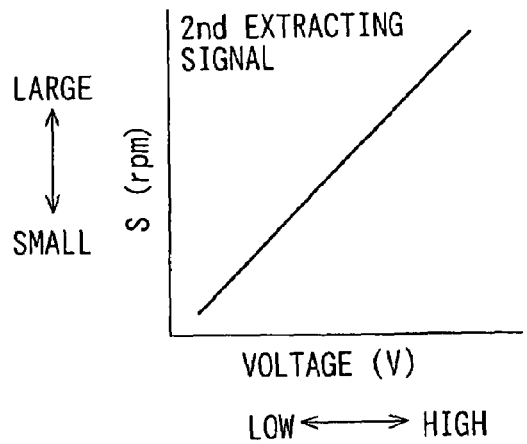
FIG. 9 is a characteristic view for explaining a second extracting signal generated in the first embodiment.

As shown in FIG. 1, the second extracting section 122 is connected to a signal line 131 branched from the signal line 130. The second extracting section 122 extracts the target rotation number S from the control information shown by the received control signal, and generates a second extracting signal showing only the extracted target rotation number S. The second extracting section 122 of this embodiment generates the second extracting signal of the voltage proportional to the target rotation number S as shown in FIG. 9 by performing the conversion processing of frequency (F)–voltage (V) with respect to the control signal of the frequency proportional to the target rotation number S.

As shown in FIG. 1, the feedback control section 124 is connected to a signal line 132 for transmitting the second extracting signal from the second extracting section 122. The feedback control section 124 determines the voltage $V_s$ applied to the motor 12 on the basis of the target rotation number S shown by the received second extracting signal. The feedback control section 124 of this embodiment is connected to three signal lines 133, 134, 135 for transmitting detecting signals of the respective Hall elements 18, and calculates the real rotation number $S_r$ of the motor shaft 14 from the detecting signals of the respective Hall elements 18. Here, the real rotation number $S_r$ is a value having no sign showing the rotating direction, and shows an absolute value of the rotation number. The feedback control section 124 further determines the voltage $V_s$ for conforming the calculated real rotation number $S_r$ to the target rotation number S by proportional control (hereinafter called P-control). The feedback control section 124 generates a command signal for giving a command of the determined voltage $V_s$ to the electric conducting section 126.

The electric conducting section 126 is connected to a signal line 136 for transmitting the first extracting signal from the first extracting section 120, a signal line 137 for transmitting the command signal from the feedback control section 124, and each terminal 23 of the motor 12. The electric conducting section 126 applies the voltage (hereinafter called a command voltage) $V_s$ commanded by the command signal to the motor 12 so as to realize the target rotating direction D shown by the received first extracting signal. The electric conducting section 126 of this embodiment is connected to signal lines 138, 139, 140 respectively branched from the signal lines 133, 134, 135. As shown in FIG. 5, the electric conducting section 126 has an inverter circuit 128 constructed by a bridge circuit with the motor 12 as a load. In such an electric conducting section 126, an order for turning on a switching element 129 of the inverter circuit 128 is determined on the basis of the rotating position of the motor shaft 14 calculated from the received detecting signal of each Hall element 18 and the target rotating direction D shown by the received first extracting signal. In the electric conducting section 126, the turning on and off of the switching element 129 are switched in accordance with this determined order, and the command voltage $V_s$ is applied to the winding 22 between turned-on two switching elements 129.

Figure 10:
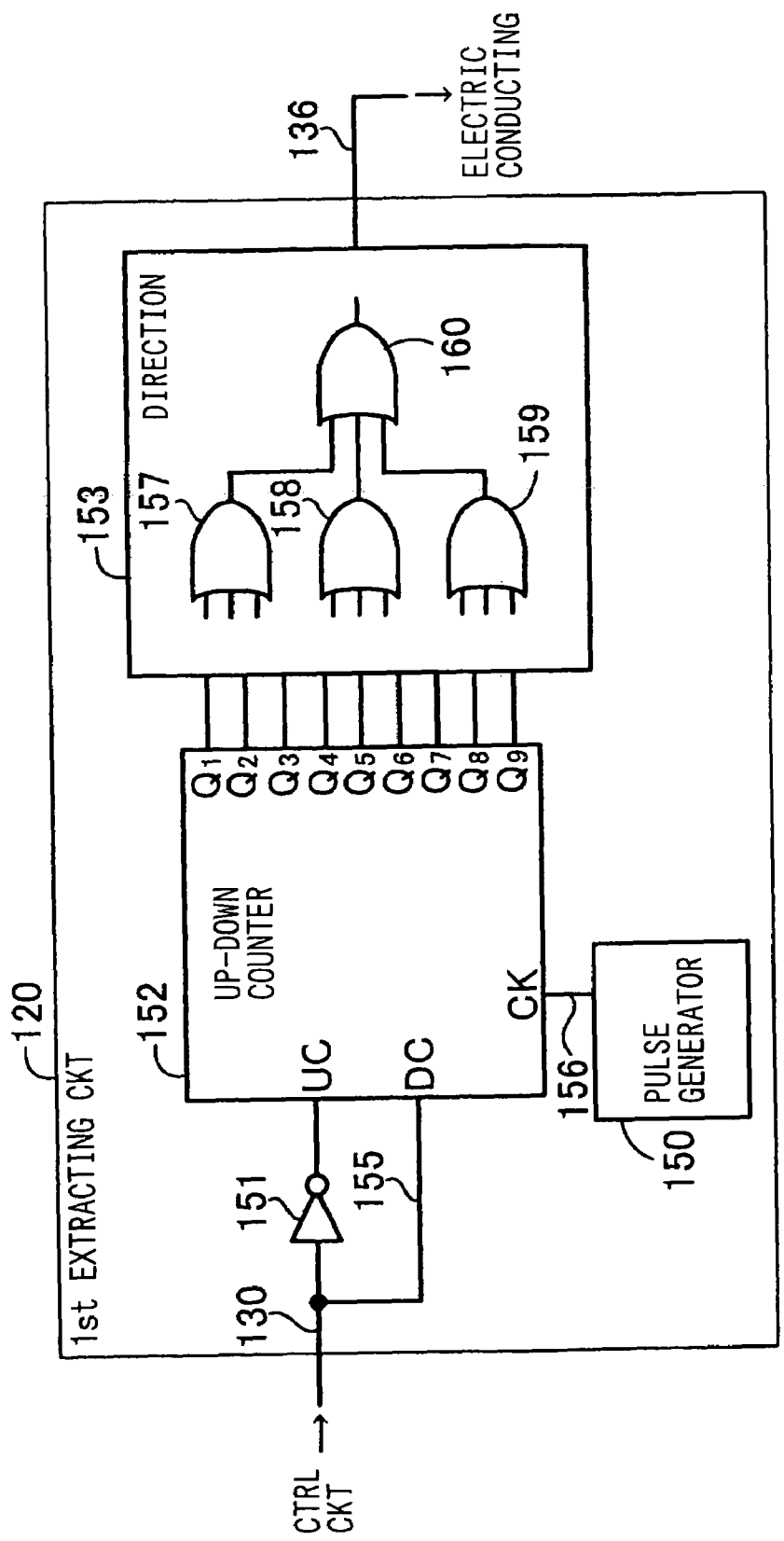
FIG. 10 is a block diagram showing the construction of a first extracting section in accordance with the first embodiment.

Next, the first extracting section 120 will next be explained in detail. As shown in FIG. 10, the first extracting section 120 has a pulse generator 150, an inverter gate 151, an up-down counter 152 and a direction determining section 153.

As shown in FIGS. 11 and 12, the pulse generator 150 generates a reference clock signal of a period τ sufficiently shorter than a minimum value of the period T of the control signal.

As shown in FIG. 10, an input terminal of the inverter gate 151 is connected to the signal line 130, and inverts and outputs the voltage of the control signal. In the following explanation, a signal outputted from the inverter gate 151 is called an inverted control signal.

The up-down counter 152 is constructed by combining plural stages of flip-flops, e.g., nine stages of the flip-flops. An output terminal of the inverter gate 151 is connected to an up count input terminal UC of the up-down counter 152, and the inverted control signal is inputted to this up count input terminal UC. A signal line 155 branched from the signal line 130 is connected to a down count input terminal DC of the up-down counter 152, and the control signal is inputted to this down count input terminal DC as it is. The pulse generator 150 is connected to a clock input terminal CK of the up-down counter 152 through a signal line 156, and the reference clock signal generated in this pulse generator 150 is inputted to this clock input terminal CK. The up-down counter 152 executes the up count or the down count every detection of a rising edge of the reference clock signal, and outputs a signal changed in voltage in accordance with a count number from output terminals (hereinafter called FF output terminals) $Q_1$ to $Q_9$ of the respective flip flops.

As shown in FIGS. 11 and 12, the time interval of two rising edges appearing in the inverted control signal conforms to the period T of the control signal. Therefore, when the up-down counter 152 detects the rising edge of the inverted control signal, the up-down counter 152 once resets the count number to 0 and then starts the up count. When the up-down counter 152 further detects the rising edge of the control signal, the up-down counter 152 starts the down count without resetting the count number. In such an up-down counter 152, it can be considered that the count number just before the reset shown by "●" in FIGS. 11D and 12D is a count number (hereinafter called a terminal count number) $C_e$ at the terminal of one period T of the control signal.

In the up-down counter 152, as shown in FIG. 12D, the count number reaching 0 by the down count is held to 0 until the count number is next reset. Namely, no count number of the up-down counter 152 becomes a negative value. In such an up-down counter 152, when the count number becomes greater than 0, the output signal of at least one of the FF output terminals $Q_1$ to $Q_9$ according to this count number is set to the H-level. When the count number becomes 0, the output signals of all the FF output terminals $Q_1$ to $Q_9$ are set to the L-level.

As mentioned above, in the up-down counter 152, the count number reaching 0 by its down count is held to 0 until this count number is next reset. Therefore, when the control signal shows the normal rotating direction by the duty ratio smaller than 50%, the terminal count number $C_e$ becomes greater than 0 as shown in FIG. 11. In contrast to this, when the control signal shows the reverse rotating direction by the duty ratio greater than 50%, the terminal count number $C_e$ becomes 0 as shown in FIG. 12. Therefore, the direction determining section 153 determines that the target rotating direction D is the normal rotating direction when the terminal count number $C_e$ of the up-down counter 152 is greater than 0. The direction determining section 153 also determines that the target rotating direction D is the reverse rotating direction when the terminal count number $C_e$ is 0.

Concretely, plural OR gates such as four OR gates 157 to 160 are arranged in the direction determining section 153 as shown in e.g., FIG. 10. Respective input terminals of the OR gate 157 are respectively connected to FF output terminals $Q_1$ to $Q_3$. Respective input terminals of the OR gate 158 are respectively connected to FF output terminals $Q_4$ to $Q_6$. Respective input terminals of the OR gate 159 are respectively connected to FF output terminals $Q_7$ to $Q_9$. Respective input terminals of the OR gate 160 are respectively connected to output terminals of the OR gates 157 to 159. When the terminal count number $C_e$ exceeds 0 so that at least one of the output signals of the FF output terminals $Q_1$ to $Q_9$ becomes the H-level, at least one of the output signals of the OR gates 157, 158, 159 becomes the H-level and the output signal of the OR gate 160 also becomes the H-level. Therefore, when the output signal of the OR gate 160 becomes the H-level, the direction determining section 153 determines that the target rotating direction D is the normal rotating direction. In contrast to this, when the terminal count number $C_e$ becomes zero so that the output signals of all the FF output terminals $Q_1$ to $Q_9$ become the L-level, each of the output signals of the OR gates 157, 158, 159 becomes the L-level, and the output signal of the OR gate 160 also becomes the L-level. Therefore, when the output signal of the OR gate 160 becomes the L-level, the direction determining section 153 determines that the target rotating direction D is the reverse rotating direction.

When the duty ratio of the control signal is accidentally changed by a disturbance such as noise superposition, etc., there is a fear that the target rotating direction D shown by this duty ratio temporarily becomes inaccurate. Therefore, in the direction determining section 153, when the determining result of the target rotating direction D continuously becomes the same result plural times, e.g., three times, it is determined that the determining result is correct, and the first extracting signal showing this target rotating direction D determined as the correct result by a voltage is generated. In contrast to this, when it is determined that no determining result is correct, the direction determining section 153 maintains the voltage of the first extracting signal as it is.

Thus, the direction determining section 153 for generating the first extracting signal showing this determining result every one judgment of the target rotating direction D may be also adopted instead of the adoption of the direction determining section 153 for determining whether the determining result of the target rotating direction D is correct or not in this way.

In the above up-down counter 152, the terminal count number $C_e$ is determined by detecting the rise of the inverted control signal. Therefore, when no control signal is transmitted to the up-down counter 152 by disconnection of the signal line 130, etc. when the control signal becomes the L-level, the inverted control signal is maintained to the H-level. Therefore, no terminal count number $C_e$ is obtained. Therefore, when the count number of the up-down counter 152 calculated from the output signals of the respective FF output terminals $Q_1$ to $Q_9$ exceeds an upper limit value $C_u$, the direction determining section 153 compulsorily generates the first extracting signal showing the normal rotating direction as the target rotating direction D. Here, for example, the upper limit value $C_u$ is a value calculated by a formula $f_1$=(maximum value of period T of control signal)/(period $\tau$ of reference clock signal).

In accordance with the first embodiment explained above, resolution of the target rotation number S can be raised since the frequency of the control signal showing the target rotation number S can be set with a large degree of freedom on the time axis. Furthermore, since each of the frequency and the duty ratio of the control signal can be independently set, two control information of the target rotation number S and the target rotating direction D can be accurately represented by one control signal. Therefore, since it is not necessary to separate a signal showing the target rotation number S and a signal showing the target rotating direction D with respect to the control signal, the number of signal lines can be reduced. In accordance with such a first embodiment, cost can be reduced by reducing the number of signal lines while the adjustment accuracy of valve timing is improved by raising the resolution of the target rotation number S.

Further, the first extracting section 120 of the first embodiment determines the target rotating direction D on the basis of the judgment as to whether the duty ratio of the control signal is large or small with respect to 50% as a reference comparison value. Therefore, time required to determine the target rotating direction D can be shortened in comparison with a case for determining whether the duty ratio conforms to one of the first reference area $R_1$ showing the normal rotating direction and the second reference area $R_2$ showing the reverse rotating direction.

Further, in the first embodiment, the motor shaft 14 is relatively rotated with respect to the sprocket 32 rotated in the same direction as its normal rotating direction. Therefore, the rotating time of the motor shaft 14 in the normal rotating direction becomes longer than that in the reverse rotating direction. However, in the first embodiment, with respect to the duty ratio of the control signal, the first reference area $R_1$ showing the normal rotating direction is set to be smaller than the second reference area $R_2$ showing the reverse rotating direction. Thus, a responsive speed is increased since time for setting the control signal to the H-level can be shortened.

(Second Embodiment)

Figure 13:
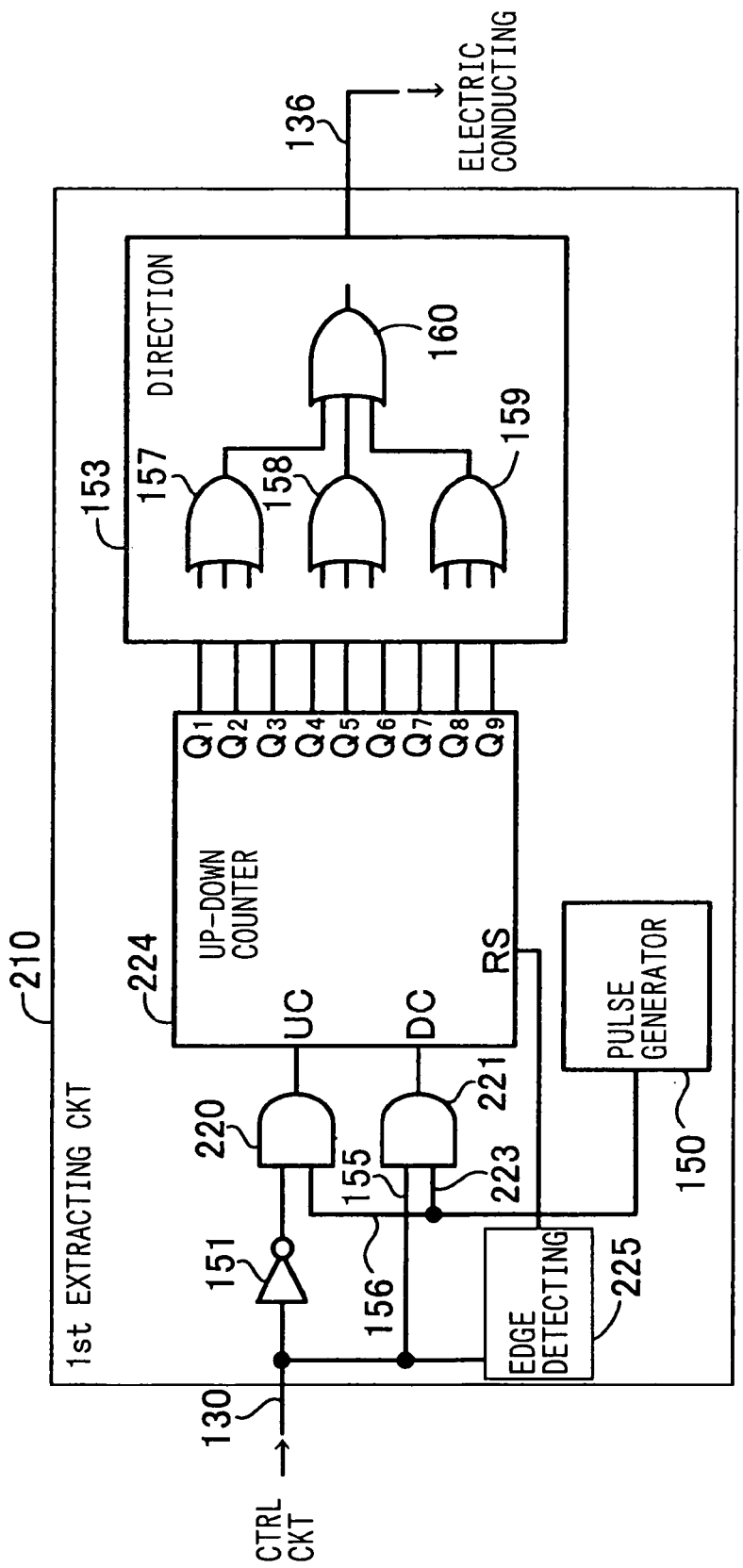
FIG. 13 is a block diagram showing the construction of a first extracting section in accordance with a second embodiment.

A first extracting section in accordance with a second embodiment of the invention is shown in FIG. 13. The second embodiment is a modified example of the first embodiment, and the same constructional portions as the first embodiment are designated by the same reference numerals, and their explanations are omitted.

AND gates 220, 221 are added to the first extracting section 210 of the second embodiment.

Respective input terminals of the first AND gate 220 are connected to the output terminal of an inverter gate 151 and a signal line 156. As shown in FIGS. 14 and 15, the first AND gate 220 sets the output signal to the H-level when both an inputted inverted control signal and a reference clock signal become the H-level. The first AND gate 220 sets the output signal to the L-level except for this case.

As shown in FIG. 13, respective input terminals of the second AND gate 221 are connected to a signal line 155 and a signal line 223 branched from a signal line 156. As shown in FIGS. 14 and 15, the second AND gate 221 sets the output signal to the H-level when both the inputted control signal and the reference clock signal become the H-level. The second AND gate 221 sets the output signal to the L-level except for this case.

An output terminal of the first AND gate 220 is connected to an up count input terminal UC of an up-down counter 224 in the first extracting section 210 shown in FIG. 13, and an output signal of this first AND gate 220 is inputted to this up count input terminal UC. An output terminal of the second AND gate 221 is connected to a down count input terminal DC of the up-down counter 224, and an output signal of the second AND gate 221 is inputted to this down count input terminal DC. An edge detecting section 225 connected to the signal line 130 and detecting a falling edge of the control signal is connected to a reset terminal RS of the up-down counter 224. An output signal of the edge detecting section 225 is inputted to the reset terminal RS as a reset signal. Here, the reset signal inputted to the reset terminal RS is set to a signal having the H-level for only a short time when the falling edge of the control signal is detected by the edge detecting section 225.

Figures 14A, 14B, 14C, 14D, 14E, 14F:
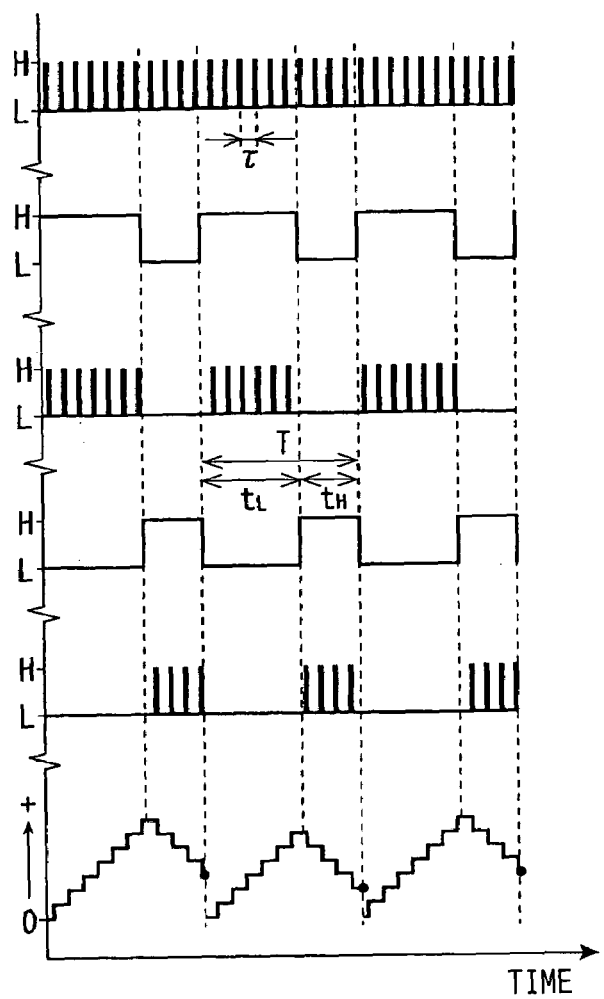
FIG. 14A to 14F are characteristic views for explaining the operation of the first extracting section in accordance with the second embodiment.

As shown in FIGS. 14 and 15, the time interval of two falling edges appearing in the control signal conforms to the period T of this control signal. Therefore, in the up-down counter 224, the count number is reset to 0 when the H-level of the reset signal appearing at the detecting time of the falling edge of the control signal using the edge detecting section 225 is detected. In such an up-down counter 224, it can be considered that the count number just before the reset shown by "●" in FIG. 14F and FIG. 15F is the terminal count number $C_e$.

The inverted control signal has the H-level during time $t_L$ for which the control signal has the L-level in accordance with its duty ratio after the falling edge appears in the control signal. At this time, the output signal of the first AND gate 220 has the H-level every time the reference clock signal has the H-level. In contrast to this, the output signal of the second AND gate 221 is held to the L-level. Further, the inverted control signal has the L-level during time $t_H$ for which the control signal of the L-level is inverted and has the H-level in accordance with the duty ratio. At this time, the output signal of the second AND gate 221 has the H-level every time the reference clock signal has the H-level. In contrast to this, the output signal of the first AND gate 220 is held to the L-level. Thus, in the up-down counter 224, the count number is reset by the detection of the H-level of the reset signal, i.e., the detection of the falling edge of the control signal. Thereafter, the up count is first performed every time the rising edge of the output signal of the first AND gate 220 is detected. Thereafter, when the control signal is changed from the L-level to the H-level, the up-down counter 224 performs the down count every time the up-down counter 224 detects the rising edge of the output signal of the second AND gate 221.

In the up-down counter 224, as shown in FIG. 15F, the count number reaching 0 by the down count is held to 0 until the count number is next reset. Accordingly, the direction determining section 153 can correctly determine the target rotating direction D similarly to the first embodiment, and can generate the first extracting signal showing this determined target rotating direction D.

In accordance with the second embodiment explained above, effects similar to those in the first embodiment can be obtained.

(Third Embodiment)

Figure 16:
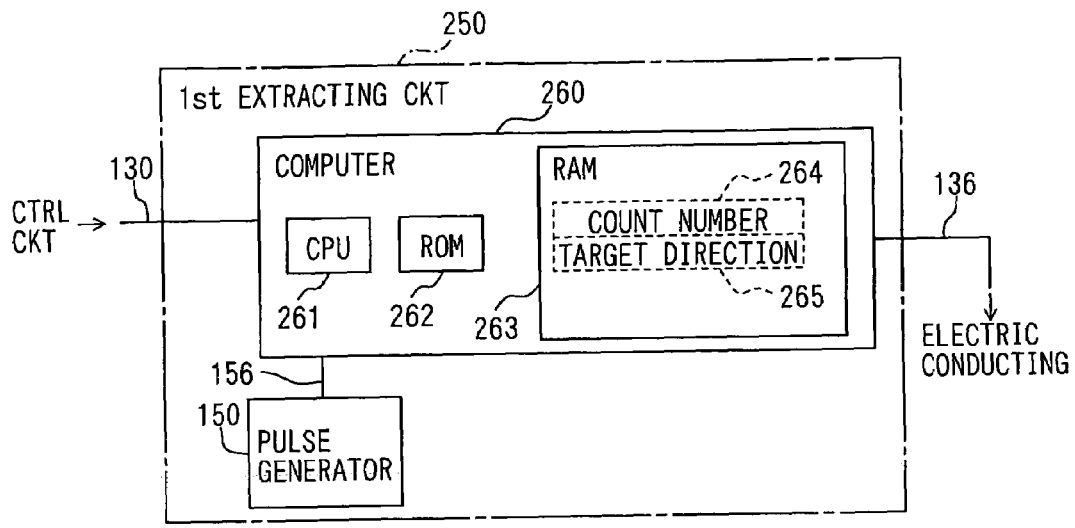
FIG. 16 is a block diagram showing the construction of a first extracting section in accordance with a third embodiment.

A first extracting section in accordance with a third embodiment of the invention is shown in FIG. 16. The third embodiment is a modified example of the first embodiment, and the same constructional portions as the first embodiment are designated by the same reference numerals and their explanations are omitted.

The first extracting section 250 of the third embodiment has a computer section 260 instead of elements 151, 152, 153, 155.

The computer section 260 is a microcomputer constructed by a CPU 261, a ROM 262, a RAM 263, etc., and is connected to signal lines 130, 136, 156. The computer section 260 shows a function similar to that of the up-down counter 152 and the direction determining section 153 of the first embodiment by executing an extraction-processing program stored to the ROM 262 by the CPU 261. A first memory area 264 for storing the count number and a second memory area 265 for storing a determining result of the target rotating direction D are arranged in the RAM 263.

Figure 17:
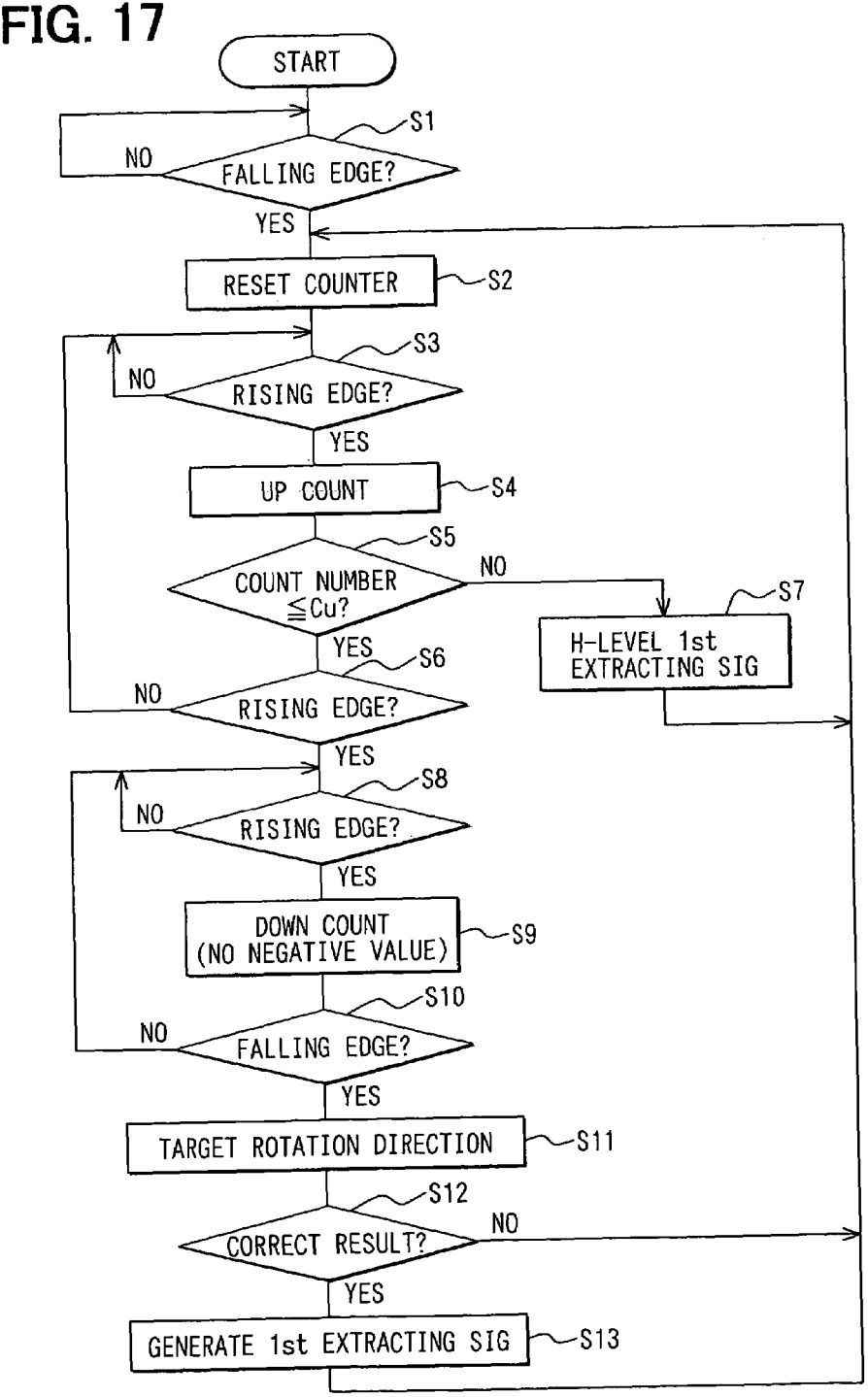
FIG. 17 is a flow chart for explaining the operation of the first extracting section in accordance with the third embodiment.

The flow chart of FIG. 17 shows each step sequentially executed by executing the extraction-processing program by the CPU 261. First, in a step S1, the appearance of a falling edge in the control signal transmitted in the signal line 130 is awaited. Here, it can be considered that the falling edge of the control signal appears in the same timing as the rising edge of the inverted control signal of the first embodiment. When the falling edge appears in the control signal, the count number of the first memory area 264 is reset to 0 in a step S2 and it then proceeds to a step S3.

In the step S3, the appearance of a rising edge in the reference clock signal is awaited. When the rising edge appears in the reference clock signal, the up count for adding 1 to the count number of the first memory area 264 is executed in a step S4 and it then proceeds to a step S5.

In the step S5, it is determined whether the count number of the first memory area 264 is an upper limit value $C_u$ or less. When the count number is the upper limit value $C_u$ or less, it proceeds to a step S6. In contrast to this, when the count number exceeds the upper limit value $C_u$, the first extracting signal of the H-level showing the normal rotating direction as the target rotating direction D is compulsorily generated in a step S7 and it is then returned to the step S2.

In the step S6, it is determined whether the rising edge appears in the control signal. When the rising edge appears in the control signal, it proceeds to a step S8. In contrast to this, when no rising edge appears in the control signal, it is returned to the step S3.

In the step S8, the appearance of the rising edge in the reference clock signal is awaited. When the rising edge appears in the reference clock signal, the down count for subtracting 1 from the count number of the first memory area 264 is executed in a step S9, and it then proceeds to a step S10. The count number reaching 0 by the down count is held to 0 and does not become a negative value until the count number is next reset.

In the step S10, it is determined whether the falling edge appears in the control signal or not. When the falling edge appears in the control signal, it proceeds to a step S11. In contrast to this, when no falling edge appears in the control signal, it is returned to the step S8.

In the step S11, it is determined whether the target rotating direction D is the normal rotating direction or the reverse rotating direction on the basis of the count number of the first memory area 264 at the time point of termination of the step S10, i.e., here, the terminal count number $C_e$. Concretely, when the terminal count number $C_e$ is greater than 0, it is determined that the target rotating direction D is the normal rotating direction. In contrast to this, when the terminal count number $C_e$ is 0, it is determined that the target rotating direction D is the reverse rotating direction. Further, in the step S11, the determining result of the target rotating direction D is stored to the second memory area 265.

In a step S12 subsequent to the step S11, the determining result of the target rotating direction D in the step S11 of this time is compared with a past determining result in the step S11, and it is determined whether the determining result of this time is correct or not. With respect to this judgment processing, it is determined that the determining result of this time is correct when all the determining results of this time and past plural times (e.g., past two times) are the same. When it is determined that the determining result of this time is correct, the first extracting signal of a voltage showing this determining result determined as the correct result is generated in a step S13, and it is then returned to the step S2. In contrast to this, when it is determined that the determining result of this time is incorrect, it is returned to the step S2 without changing the voltage of the first extracting signal.

In accordance with the third embodiment explained above, effects similar to those in the first embodiment can be obtained.

In the third embodiment, at least one of the functions of the second extracting section 122, the function of the feedback control section 124 and the function of one portion of the electric conducting section 126 may be also realized by the computer section 260.

Further, in the third embodiment, the first extracting signal showing the determining result of the step S11 as it is may be also generated in the step S13 without executing the step S12.

Furthermore, in the third embodiment, the first extracting signal is held to the H-level showing the normal rotating direction and the extraction-processing program may be compulsorily terminated instead of the return to the step S2 after the step S7 is executed.

Furthermore, in the third embodiment, the inverter gate 151 and the signal line 155 of the first embodiment may be also connected to the computer section 260. In this case, in steps S1 and S10, the extraction-processing program is changed so as to monitor the rising edge of the inverted control signal instead of the monitor of the falling edge of the control signal.

(Fourth Embodiment)

Figure 18:
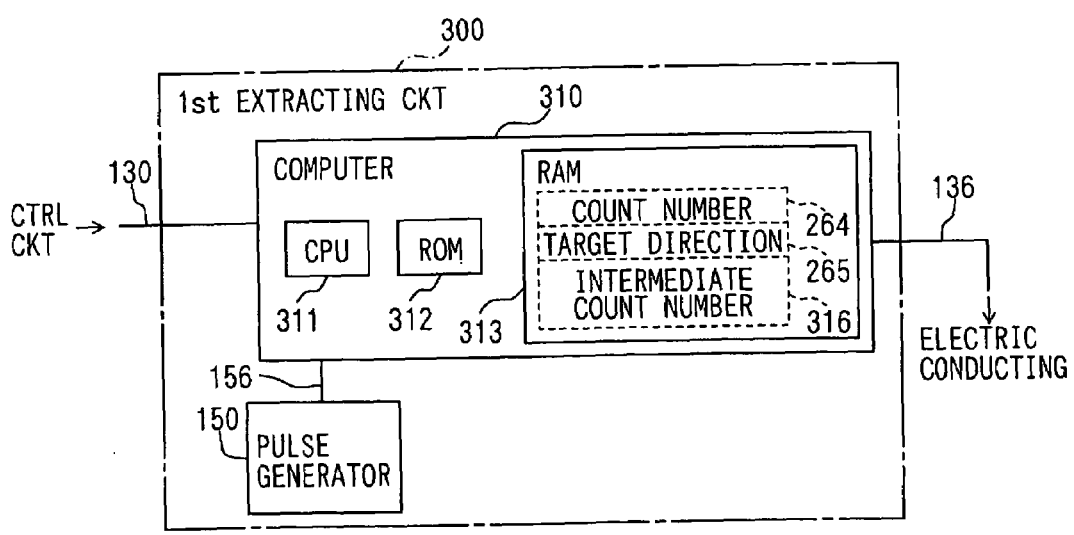
FIG. 18 is a block diagram showing the construction of a first extracting section in accordance with a fourth embodiment.

A first extracting section in accordance with a fourth embodiment of the invention is shown in FIG. 18. The fourth embodiment is a modified example of the third embodiment, and the same constructional portions as the third embodiment are designated by the same reference numerals, and their explanations are omitted.

The first extracting section 300 of the fourth embodiment differs from that of the third embodiment in an extraction-processing program stored to a ROM 312 of a computer section 310. An intermediate count number $C_m$ described later is stored to a third memory area 316 of a RAM 313 in the computer section 310 by this difference of the extraction processing program. Further, in the computer section 310, it is determined by the difference of the extraction-processing program that the target rotating direction D is the normal rotating direction when the duty ratio of the control signal substantially conforms to the first reference area $R_1$. Further, it is also determined that the target rotating direction D is the reverse rotating direction when the duty ratio substantially conforms to the second reference area $R_2$.

The flow chart of FIG. 19 shows each step sequentially executed by executing the extraction-processing program of the fourth embodiment by a CPU 311 of the computer section 310. First, a step S21 is executed similarly to the step S1 of the third embodiment.

In a step S22 transferred when the falling edge appears in the control signal in the step S21, it proceeds to a step S23 after the count number of the first memory area 264 and the intermediate count number $C_m$ of the third memory area 316 are reset to 0.

Steps S23 to S27 are executed similarly to steps S3 to S7 of the third embodiment.

In a step S28 transferred when the rising edge appears in the control signal in the step S26, the count number at a terminating time point of the step S26 is stored to the third memory area 316 as the intermediate count number $C_m$. Here, the intermediate count number $C_m$ is a count number shown by "○" in FIGS. 20C and 21C.

In a step S29 subsequent to the step S28, the appearance of a rising edge in the reference clock signal is awaited. When the rising edge appears in the reference clock signal, the down count for subtracting 1 from the count number of the first memory area 264 is executed in a step S30, and it then proceeds to a step S31. In this embodiment, when the count number reaches 0 by the down count of the step S30 and the down count is advanced by the step S30 of the next time or later, the count number is not held to 0 and becomes a negative value as shown in FIG. 21C.

The step S31 is executed similarly to the step S10 of the third embodiment.

In a step S32 transferred when the falling edge appears in the control signal in the step S31, it is determined that the target rotating direction D is the normal rotating direction or the reverse rotating direction on the basis of the terminal count number $C_e$ of the first memory area 264 and the intermediate count number $C_m$ of the third memory area 316. Judgment processing of the step S32 will next be concretely explained.

As can be seen from FIGS. 20 and 21, in this embodiment, the duty ratio of the control signal can be represented by a formula $f_2=(C_m-C_e)/\{C_m+(C_m-C_e)\}$ with the intermediate count number $C_m$ and the terminal count number $C_e$ as variables.

As shown in FIG. 20, when the control signal shows the normal rotating direction by the first reference area $R_1$ less than 50%, the intermediate count number $C_m$ and the terminal count number $C_e$ respectively become positive values according to the first reference area $R_1$. Therefore, the value of the formula $f_2$ substantially conforms to the first reference area $R_1$. Here, "substantially conform" means that the value of the formula $f_2$ conforms to the first reference area $R_1$ within the range of an error (hereinafter, simply called an error) $\pm\epsilon_1$ caused by varying the intermediate count number $C_m$ and the terminal count number $C_e$ since the period $\tau$ of the reference clock signal is finite.

As shown in FIG. 21, when the control signal shows the reverse rotating direction by the second reference area $R_2$ exceeding 50%, the intermediate count number $C_m$ becomes a positive value according to the second reference area $R_2$ and the terminal count number $C_e$ becomes a negative value according to the second reference area $R_2$. Therefore, the value of the formula $f_2$ substantially conforms to the second reference area $R_2$. Here, "substantially conform" means that the value of the formula $f_2$ conforms to the second reference area $R_2$ with the range of an error $\pm\epsilon_2$.

On the basis of the above knowledge, it is determined in the step S32 that the target rotating direction D is the normal rotating direction when the value of the formula $f_2$ substantially conforms to the first reference area $R_1$. It is also determined that the target rotating direction D is the reverse rotating direction when the value of the formula $f_2$ substantially conforms to the second reference area $R_2$. Thus, in this embodiment, the first reference area $R_1$ corresponds to a first reference value, and the second reference area $R_2$ corresponds to a second reference value.

Steps S33, S34 subsequent to the step S32 are executed similarly to steps S12, S13 of the third embodiment. In this fourth embodiment, the first extracting signal showing the determining result of the step S32 as it is may be also generated in the step S34 without executing the step S33.

In the fourth embodiment explained above, since the target rotating direction D is determined on the basis of the judgment as to whether the value of the formula $f_2$ showing the duty ratio of the control signal substantially conforms to any one of the ratios $R_1$, $R_2$, its judgment becomes accurate.

Further, in accordance with the fourth embodiment, similar to the first embodiment, the improvement of adjustment accuracy of valve timing and a reduction in cost can be reconciled and a response speed is increased.

(Fifth Embodiment)

A motor controller in accordance with a fifth embodiment of the invention is shown in FIG. 22. The fifth embodiment is a modified example of the first embodiment. The same constructional portions as the first embodiment are designated by the same reference numerals and their explanations are omitted.

An abnormality determining section 362 is added in a driving circuit 360 of the motor controller 350 of the fifth embodiment.

The abnormality determining section 362 has an inverter gate 370, a comparator 371 and a transistor 372.

An input terminal of the inverter gate 370 is connected to a signal line 136, and the inverter gate 370 inverts and outputs the voltage of a first extracting signal. Here, as shown in FIG. 23, the output signal of the inverter gate 370 becomes the L-level, particularly, about 0 V in this embodiment when the normal rotating direction is shown as the target rotating direction D. The output signal of the inverter gate 370 becomes the H-level when the reverse rotating direction is shown as the target rotating direction D. In the following explanation, the output signal of the inverter gate 370 is called an inverted first extracting signal.

As shown in FIG. 22, a signal line 373 branched from a signal line 132 is connected to a non-inverted input terminal of the comparator 371, and a second extracting signal is inputted to this non-inverted input terminal through signal lines 132, 373. A reference voltage $V_{ref}$ is inputted to an inverted input terminal of the comparator 371 through a signal line 374. The comparator 371 raises and lowers the voltage of the output signal by comparing the voltage of the second extracting signal with the reference voltage $V_{ref}$. Concretely, as shown in FIG. 24, the comparator 371 sets the output signal to the H-level when the voltage of the second extracting signal becomes the reference voltage $V_{ref}$ or more. The comparator 371 sets the output signal to the L-level when the voltage of the second extracting signal is lower than the reference voltage $V_{ref}$. Here, as shown in FIG. 24A, the reference voltage $V_{ref}$ is a voltage corresponding to a predetermined threshold value $S_{th}$ set within an allowable interval of the target rotation number S. Accordingly, the output signal of the comparator 371 becomes the H-level when the target rotation number S shown by the second extracting signal becomes the threshold value $S_{th}$ or more. The output signal of the comparator 371 becomes the L-level when the target rotation number S is lower than the threshold value $S_{th}$.

The threshold value $S_{th}$ is set to a value greater than a maximum rotation number of the reverse rotating direction of the motor shaft 14 set in the motor 12 and smaller than a maximum rotation number of the normal rotating direction of the motor shaft 14 set in the motor 12. For example, when the maximum rotation number of the reverse rotating direction is 2000 rpm and the maximum rotation number of the normal rotating direction is 8000 rpm, the threshold value $S_{th}$ is set to about 4000 rpm.

As shown in FIG. 22, an output terminal of the comparator 371 is connected to the base of the transistor 372 through a signal line 375, and an output signal of this comparator 371 is inputted to this base. The collector of the transistor 372 is connected to the intermediate portion of a signal line 376 connected to an output terminal of the inverter gate 370 and transmitting the inverted first extracting signal to an electric conducting section 380. The emitter of the transistor 372 is connected to the ground. Thus, when the output signal of the comparator 371 becomes the H-level, the transmission of the inverted first extracting signal using the signal line 376 is disabled. In contrast to this, when the output signal of the comparator 371 becomes the L-level, the transmission of the inverted first extracting signal using the signal line 376 can be performed.

In the electric conducting section 380 of the driving circuit 360, a command voltage $V_s$ is applied to the motor 12 so as to realize the target rotating direction D shown by the inverted first extracting signal when the inverted first extracting signal is received. In contrast to this, when no inverted first extracting signal is received, the electric conducting section 380 equivalently attains a state in which the electric conducting section 380 receives a voltage signal of about 0 V. Therefore, similar to the receiving time of the inverted first extracting signal showing the normal rotating direction by the voltage of about 0 V at the L-level, the electric conducting section 380 executes the voltage application for realizing the normal rotating direction with respect to the motor 12. Namely, when no inverted first extracting signal is received, the electric conducting section 380 compulsorily sets the target rotating direction D to the normal rotating direction.

In such a fifth embodiment, when the second extracting signal obtained by F–V-converting the control signal shows the target rotation number S of the threshold value $S_{th}$ or more, the output signal of the comparator 371 becomes the H-level. At this time, the reception of the inverted first extracting signal is disabled in the electric conducting section 380 by the operation of the transistor 372. Therefore, the target rotating direction D is compulsorily set to the normal rotating direction. Accordingly, even when the control signal shows the reverse rotating direction by a disturbance such as noise superposition, etc., the target rotating direction D is compulsorily set to the normal rotating direction. Thus, there is no case in which the real rotation number $S_r$ of the motor shaft 14 is suddenly increased to a rotation number originally impossible in the reverse rotating direction. Therefore, the problem that the phase changing mechanism 30, etc. are broken by the sudden increase in the real rotation number $S_r$ in the reverse rotating direction is not caused. Further, since the electric conduction with respect to the motor 12 can be continued by compulsorily setting the target rotating direction D to the normal rotating direction, the effect that a disturbance resisting property is improved is also obtained.

Further, in accordance with the fifth embodiment, effects similar to those in the first embodiment can be obtained.

(Sixth Embodiment)

Figure 25:
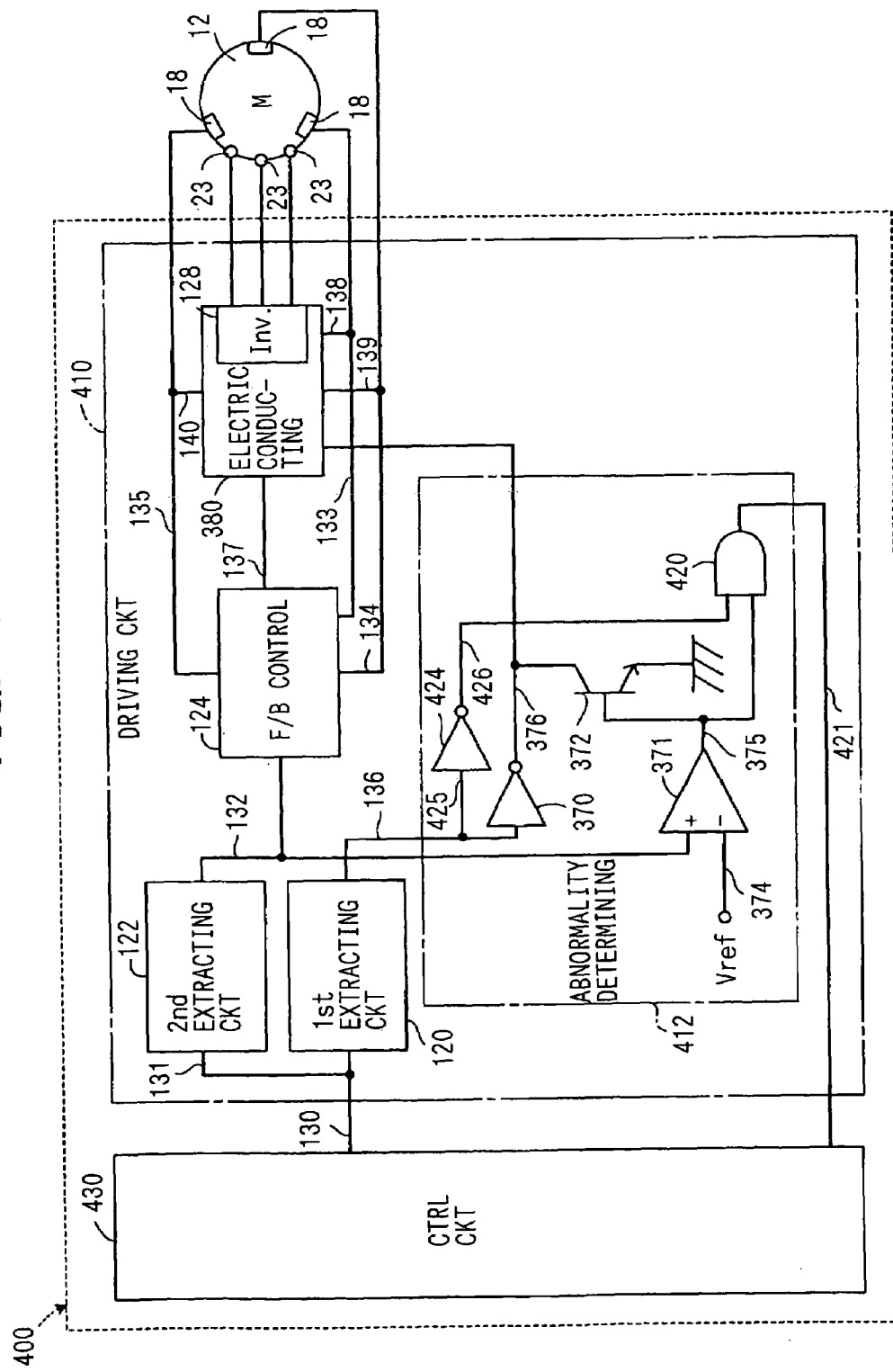
FIG. 25 is a block diagram showing a motor controller in accordance with a sixth embodiment.

A motor controller in accordance with a sixth embodiment of the invention is shown in FIG. 25. The sixth embodiment is a modified example of the fifth embodiment, and the same constructional portions as the fifth embodiment are designated by the same reference numerals, and their explanations are omitted.

In the motor controller 400 of the sixth embodiment, a driving circuit 410 has an abnormality determining section 412 having an AND gate 420 and an inverter gate 424 in addition to elements 370, 371, 372.

The inverter gate 424 is connected to a signal line 425 branched from a signal line 136, and outputs an inverted first extracting signal similarly to the inverter gate 370. Respective input terminals of the AND gate are connected to a signal line 426 connected to an output terminal of the inverter gate 424 and transmitting the inverted first extracting signal, and the intermediate portion of a signal line 375. As shown in FIG. 26, when both the inputted output signal of the comparator 371 and the inverted first extracting signal become the H-level, the AND gate 420 sets its own output signal to the H-level. The AND gate 420 sets its own output signal to the L-level except for this case.

As shown in FIG. 25, an output terminal of the AND gate 420 is connected to a control circuit 430 of the sixth embodiment through a signal line 421, and an output signal of this AND gate 420 is transmitted to this control circuit –430.

In such a sixth embodiment, when the second extracting signal shows the target rotation number S smaller than the threshold value $S_{th}$, the output signal of the comparator 371 becomes the L-level. Accordingly, as shown in FIG. 26, the output signal of the AND gate 420 becomes the L-level. Further, even when the second extracting signal shows the target rotation number S of the threshold value $S_{th}$ or more so that the output signal of the comparator 371 becomes the H-level, the output signal of the AND gate 420 becomes the L-level when the inverted first extracting signal becomes the L-level showing the normal rotating direction. In contrast to these cases, when the second extracting signal shows the target rotation number S of the threshold value $S_{th}$ or more and the inverted first extracting signal becomes the H-level showing the reverse rotating direction, the output signal of the AND gate 420 becomes the H-level. Therefore, when a signal received from the AND gate 420 becomes the H-level, the control circuit 430 recognizes that an abnormality such as noise superposition, etc. is caused in the control signal, and stops the generation of the control signal. Thus, in this embodiment, the output signal of the AND gate 420 transmitted to the control circuit 430 corresponds to an abnormality signal showing the abnormality.

In accordance with the sixth embodiment explained above, a treatment with respect to the abnormality can be rapidly taken since the control circuit 430 can immediately stop the generation of the control signal when the abnormality is generated in the control signal.

Furthermore, in accordance with the sixth embodiment, effects similar to those in the fifth embodiment can be obtained.

(Seventh Embodiment)

Figure 27:
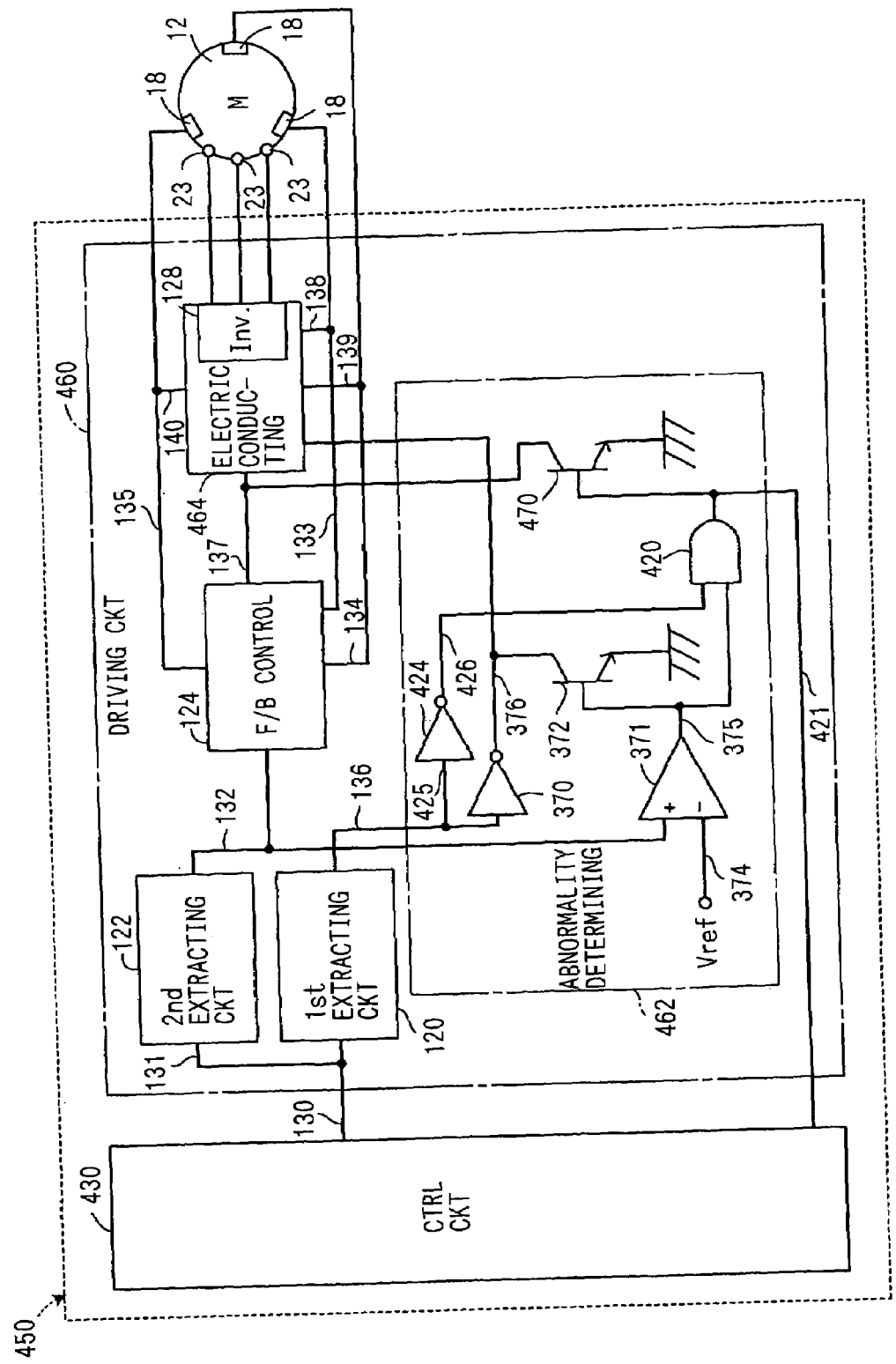
FIG. 27 is a block diagram showing a motor controller in accordance with a seventh embodiment.

A motor controller in accordance with a seventh embodiment of the invention is shown in FIG. 27. The seventh embodiment is a modified example of the sixth embodiment. The same constructional portions as the sixth embodiment are designated by the same reference numerals, and their explanations are omitted.

In the motor controller 450 of the seventh embodiment, a driving circuit 460 has an abnormality determining section 462 having a transistor 470 in addition to elements 370, 371, 372, 420, 424.

The base of the transistor 470 is connected to the intermediate portion of a signal line 421, and the collector of the transistor 470 is connected to the intermediate portion of a signal line 137. The emitter of the transistor 470 is connected to the ground. Thus, when the output signal of the AND gate 420 becomes the H-level, the transmission of a command signal using the signal line 137 is disabled. In contrast to this, when the output signal of the AND gate 420 becomes the L-level, the transmission of the command signal using the signal line 137 can be performed.

In such a seventh embodiment, when the second extracting signal shows the target rotation number S of the threshold value $S_{th}$ or more and the inverted first extracting signal shows the reverse rotating direction, the output signal of the AND gate 420 becomes the H-level and the reception of the command signal is inhibited in an electric conducting section 464 of the driving circuit 460. Therefore, when the reception of the command signal is disabled in the electric conducting section 464, the electric conduction to the motor 12 is compulsorily stopped. Accordingly, the electric conduction to the motor 12 is stopped even when the control signal shows the reverse rotating direction by a disturbance. Thus, there is no case in which the real rotation number $S_r$ of the motor shaft 14 is suddenly increased to a rotation number originally impossible in the reverse rotating direction. Therefore, no problem that the phase changing mechanism 30, etc. are broken by the sudden increase of the real rotation number $S_r$ in the reverse rotating direction is caused. When the second extracting signal shows the target rotation number S of the threshold value $S_{th}$ or more but the inverted first extracting signal shows the normal rotating direction, the electric conducting section 464 compulsorily sets the target rotating direction D to the normal rotating direction similarly to the electric conducting section 380 of the fifth embodiment. Thus, the electric conduction to the motor 12 can be continued as usual.

Furthermore, in accordance with the seventh embodiment, effects similar to those in the first embodiment can be obtained.

Moreover, in accordance with the seventh embodiment, when an abnormality is generated in the control signal, a treatment with respect to the abnormality is rapidly taken since the control circuit 430 can immediately stop the generation of the control signal similarly to the sixth embodiment.

In the seventh embodiment, the output signal of the AND gate 420 may be also set so as not to be transmitted to the control circuit 430.

(Eighth Embodiment)

Figure 28:
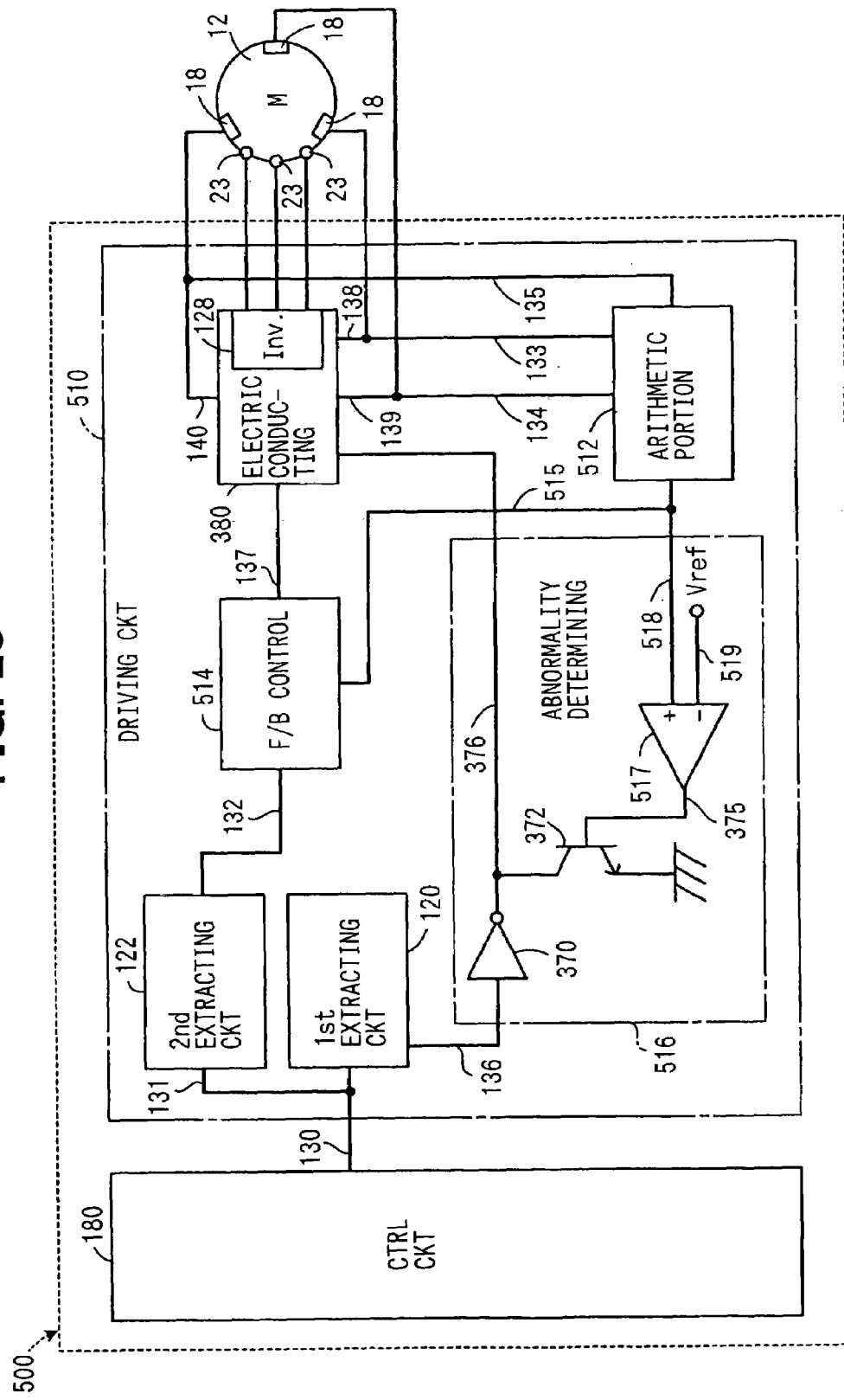
FIG. 28 is a block diagram showing a motor controller in accordance with an eighth embodiment.

A motor controller in accordance with an eighth embodiment of the invention is shown in FIG. 28. The eighth embodiment is a modified example of the fifth embodiment. The same constructional portions as the fifth embodiment are designated by the same reference numerals and their explanations are omitted.

An arithmetic section 512 is added to a driving circuit 510 of the motor controller 500 of the eighth embodiment.

The arithmetic section 512 is connected to signal lines 133, 134, 135, and calculates the real rotation number $S_r$ of the motor shaft 14 from a received detecting signal of each Hall element 18. Further, the arithmetic section 512 generates a rotation number signal having a voltage proportional to the calculated real rotation number $S_r$ as shown in FIG. 29A.

As shown in FIG. 28, a feedback control section 514 of the driving circuit 510 is connected to a signal line 515 for transmitting the rotation number signal from the arithmetic section 512. The feedback control section 514 determines a command voltage $V_s$ for conforming the real rotation number $S_r$ shown by the received rotation number signal to the target rotation number S by the P-control, and generates a command signal showing this determined command voltage $V_s$.

In an abnormality determining section 516 of the driving circuit 510, a signal line 518 branched from the signal line 515 is connected to a non-inverted input terminal of a comparator 517, and the rotation number signal is inputted to this non-inverted input terminal through the signal lines

515, 518. A reference voltage $V_{ref}$ is inputted to an inverted input terminal of the comparator 517 through a signal line 519. The comparator 517 raises and lowers the voltage of an output signal by comparing the voltage of the rotation number signal with the reference voltage $V_{ref}$. Concretely, as shown in FIG. 29, the comparator 517 sets the output signal to the H-level when the voltage of the rotation number signal becomes the reference voltage $V_{ref}$ or more. The comparator 517 sets the output signal to the L-level when the voltage of the rotation number signal is lower than the reference voltage $V_{ref}$. Here, as shown in FIG. 29A, the reference voltage $V_{ref}$ is a voltage corresponding to the threshold value $S_{th}$ determined similarly to the fifth embodiment. Accordingly, the output signal of the comparator 517 becomes the H-level when the real rotation number $S_r$ shown by the rotation number signal becomes the threshold value $S_{th}$ or more. The output signal of the comparator 517 becomes the L-level when the real rotation number $S_r$ is lower than the threshold value $S_{th}$. The output signal of the comparator 517 changed in voltage in this way is transmitted to the base of the transistor 372 through the signal line 375.

In such an eighth embodiment, when the real rotation number $S_r$ shown by the rotation number signal is the threshold value $S_{th}$ or more, it is possible to presume that the target rotation number S shown by the control signal is also about the threshold value $S_{th}$ or more. Further, when the real rotation number $S_r$ shown by the rotation number signal is the threshold value $S_{th}$ or more, the output signal of the comparator 517 becomes the H-level. Accordingly, the reception of the inverted first extracting signal is disabled in the electric conducting section 380 by the operation of the transistor 372, and the target rotating direction D is compulsorily set to the normal rotating direction. Accordingly, the target rotating direction D is compulsorily set to the normal rotating direction even when the control signal shows the reverse rotating direction by a disturbance. Thus, there is no case in which the real rotation number $S_r$ is suddenly increased to a rotation number originally impossible in the reverse rotating direction. Therefore, no problem that the phase changing mechanism 30, etc. are broken by the sudden increase of the real rotation number $S_r$ in the reverse rotating direction is caused. Further, the disturbance resisting property is improved since the electric conduction with respect to the motor 12 can be continued by compulsorily setting the target rotating direction D to the normal rotating direction.

Further, in accordance with the eighth embodiment, effects similar to those in the first embodiment can be obtained.

(Ninth Embodiment)

Figure 30:
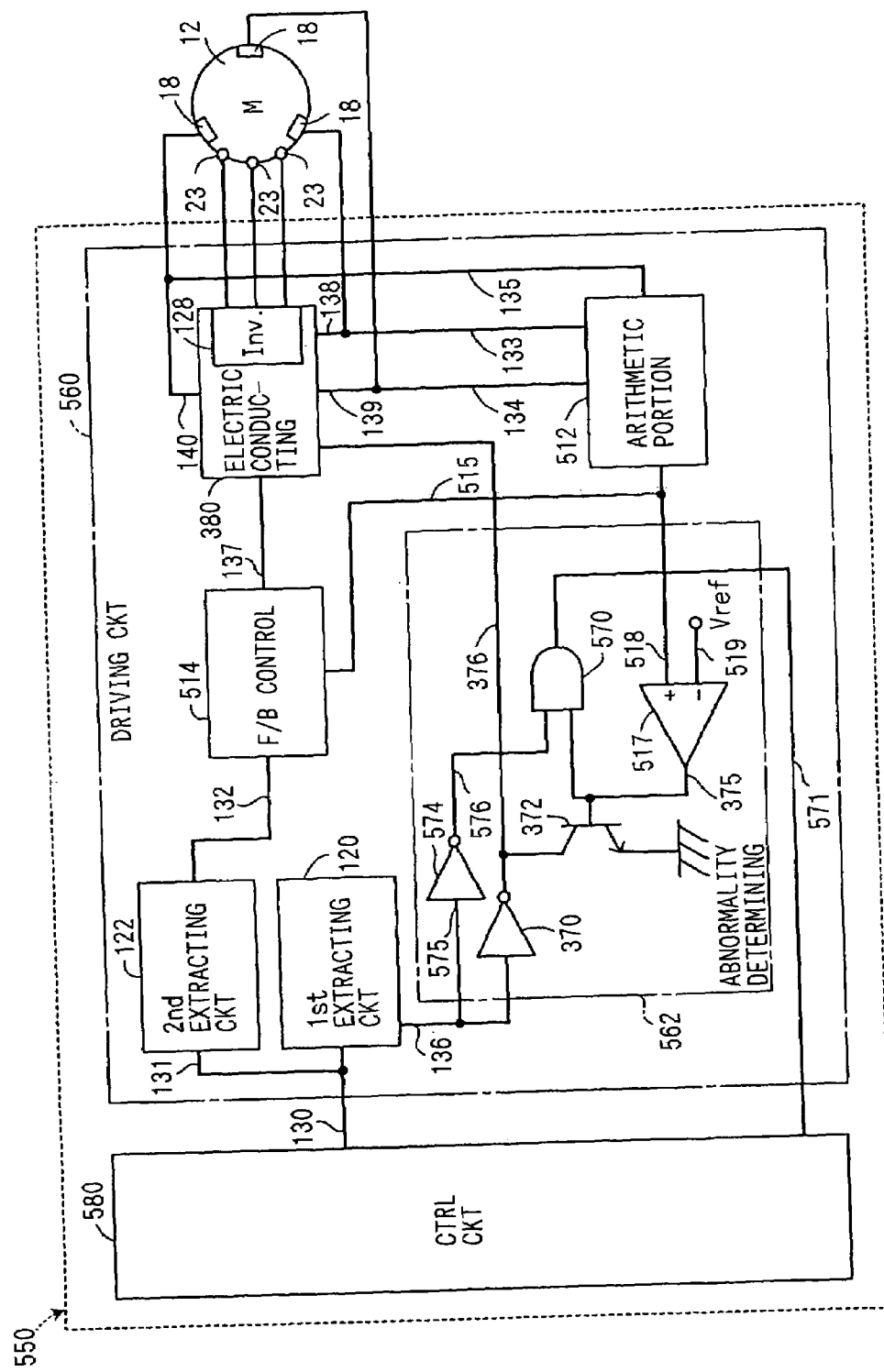
FIG. 30 is a block diagram showing a motor controller in accordance with a ninth embodiment.

A motor controller in accordance with a ninth embodiment of the invention is shown in FIG. 30. The ninth embodiment is a modified example in which a characteristic construction of the sixth embodiment is added to the eighth embodiment. The same constructional portions as the eighth embodiment are designated by the same reference numerals, and their explanations are omitted.

In the motor controller 550 of the ninth embodiment, a driving circuit 560 has an abnormality determining section 562 having an AND gate 570 and an inverter gate 574 in addition to elements 370, 517, 372.

The inverter gate 574 is connected to a signal line 575 branched from a signal line 136 similarly to the inverter gate 424 of the sixth embodiment, and outputs an inverted first extracting signal. Similar to the AND gate 420 of the sixth embodiment, respective input terminals of the AND gate 570 are connected to a signal line 576 connected to an output terminal of the inverter gate 574, and the intermediate portion of a signal line 375. Accordingly, the AND gate 570 sets its own output signal to the H-level when both the output signal of a comparator 517 and the inverted first extracting signal become the H-level. The AND gate 570 sets its own output signal to the L-level except for this case.

Similar to the sixth embodiment, an output terminal of the AND gate 570 is connected to a control circuit 580 of the ninth embodiment through a signal line 571, and the output signal of this AND gate 570 is transmitted to this control circuit 580.

In such a ninth embodiment, the output signal of the AND gate 570 becomes the L-level since the output signal of the comparator 517 becomes the L-level when the rotation number signal shows the real rotation number $S_r$ smaller than the threshold value $S_{th}$. Further, the output signal of the AND gate 570 becomes the L-level when the inverted first extracting signal becomes the L-level showing the normal rotating direction even when the output signal of the comparator 517 becomes the H-level since the rotation number signal shows the real rotation number $S_r$ of the threshold value $S_{th}$ or more. In contrast to these cases, when the rotation number signal shows the real rotation number $S_r$ of the threshold value $S_{th}$ or more and the inverted first extracting signal becomes the H-level showing the reverse rotating direction, the output signal of the AND gate 570 becomes the H-level. Therefore, when a signal received from the AND gate 570 becomes the H-level, the control circuit 580 recognizes that an abnormality is generated in the control signal, and stops the generation of the control signal. Thus, in this embodiment, the output signal of the AND gate 570 transmitted to the control circuit 580 corresponds to an abnormality signal showing the abnormality.

In accordance with the ninth embodiment explained above, a treatment with respect to the abnormality is rapidly taken since the control circuit 580 can immediately stop the generation of the control signal when the abnormality is generated in the control signal.

Furthermore, in accordance with the ninth embodiment, effects similar to those in the eighth embodiment can be obtained.

(Tenth Embodiment)

Figure 31:
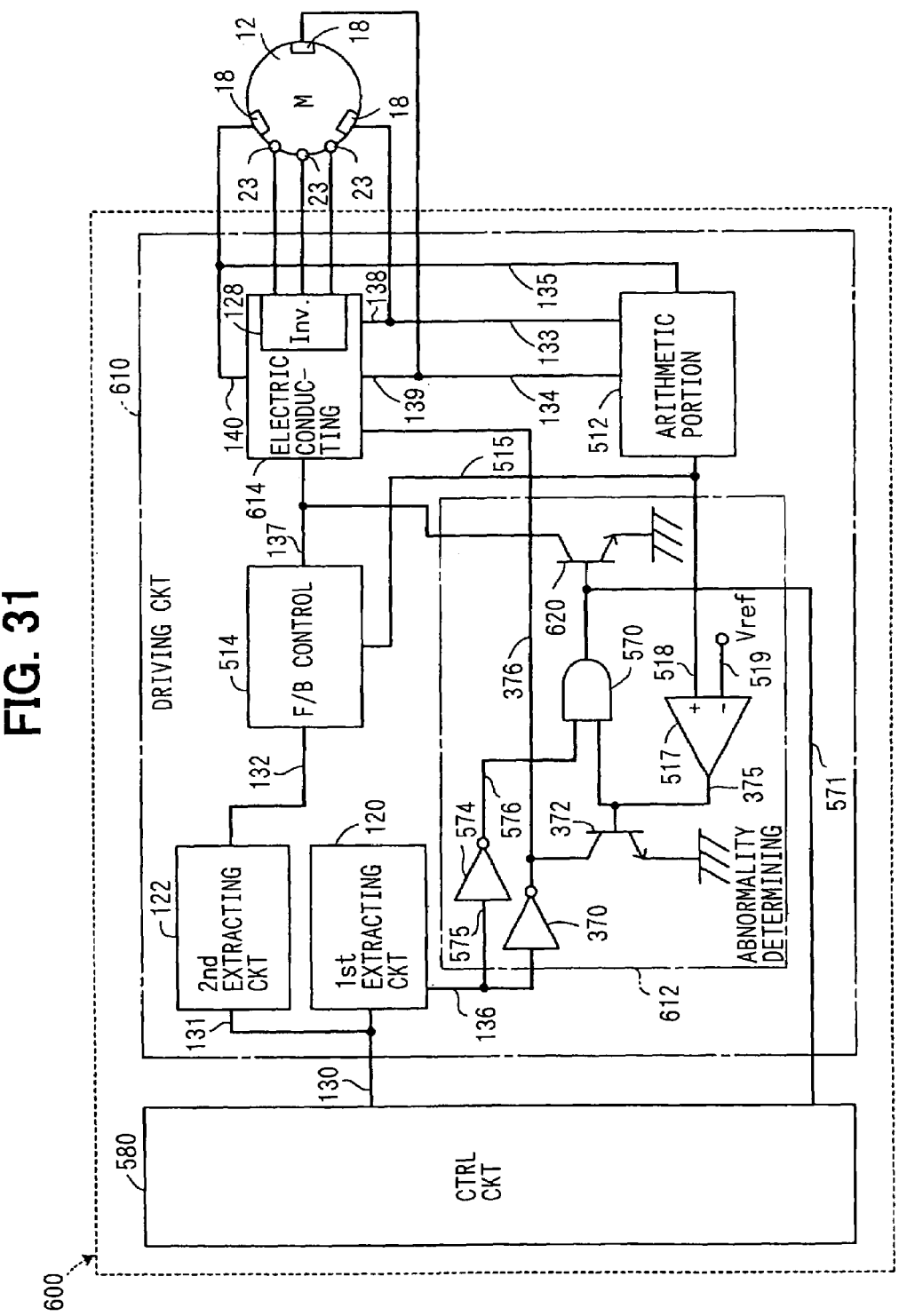
FIG. 31 is a block diagram showing a motor controller in accordance with a tenth embodiment.

A motor controller in accordance with a tenth embodiment of the invention is shown in FIG. 31. The tenth embodiment is a modified example in which a characteristic construction of the seventh embodiment is added to the ninth embodiment. The same constructional portions as the ninth embodiment are designated by the same reference numerals, and their explanations are omitted.

In the motor controller 600 of the tenth embodiment, a driving circuit 610 has an abnormality determining section 612 having a transistor 620 in addition to elements 370, 517, 372, 570, 574.

Similar to the transistor 470 of the seventh embodiment, the base of the transistor 620 is connected to the intermediate portion of a signal line 571 and the collector of the transistor 620 is connected to the intermediate portion of a signal line 137. The emitter of the transistor 620 is connected to the ground. Accordingly, when the output signal of an AND gate 570 becomes the H-level, the transmission of a command signal using the signal line 137 is disabled. In contrast to this, when the output signal of the AND gate 570 becomes the L-level, the transmission of the command signal using the signal line 137 can be performed.

In such a tenth embodiment, the output signal of the AND gate 570 becomes the H-level when the rotation number signal shows the real rotation number $S_r$ of the threshold value $S_{th}$ or more and the inverted first extracting signal shows the reverse rotating direction. The reception of the command signal is inhibited in an electric conducting section 614 of the driving circuit 610. Therefore, the electric conduction to the motor 12 is compulsorily stopped in the electric conducting section 614 when the reception of the command signal is disabled. In this embodiment, when the real rotation number $S_r$ is the threshold value $S_{th}$ or more, it is possible to presume that the target rotation number S is also about the threshold value $S_{th}$ or more. Therefore, the electric conduction to the motor 12 is stopped even when the control signal shows the reverse rotating direction by a disturbance. Thus, there is no case in which the real rotation number $S_r$ is suddenly increased to the target rotation number S originally impossible in the reverse rotating direction. Therefore, no problem that the phase changing mechanism 30, etc. are broken by the sudden increase of the real rotation number $S_r$ in the reverse rotating direction is caused. When the rotation number signal shows the target rotation number S of the threshold value $S_{th}$ or more but the inverted first extracting signal shows the normal rotating direction, the electric conducting section 614 compulsorily sets the target rotating direction D to the normal rotating direction similarly to the electric conducting section 380 of the eighth embodiment. Thus, the electric conduction to the motor 12 can be continued as usual.

Furthermore, in accordance with the tenth embodiment, effects similar to those in the first embodiment can be obtained.

Moreover, in accordance with the tenth embodiment, when an abnormality is generated in the control signal, a treatment with respect to the abnormality is rapidly taken since the control circuit 580 can immediately stop the generation of the control signal similarly to the ninth embodiment.

In the tenth embodiment, the output signal of the AND gate 570 may be also set so as not to be transmitted to the control circuit 580.

(Eleventh Embodiment)

Figure 32:
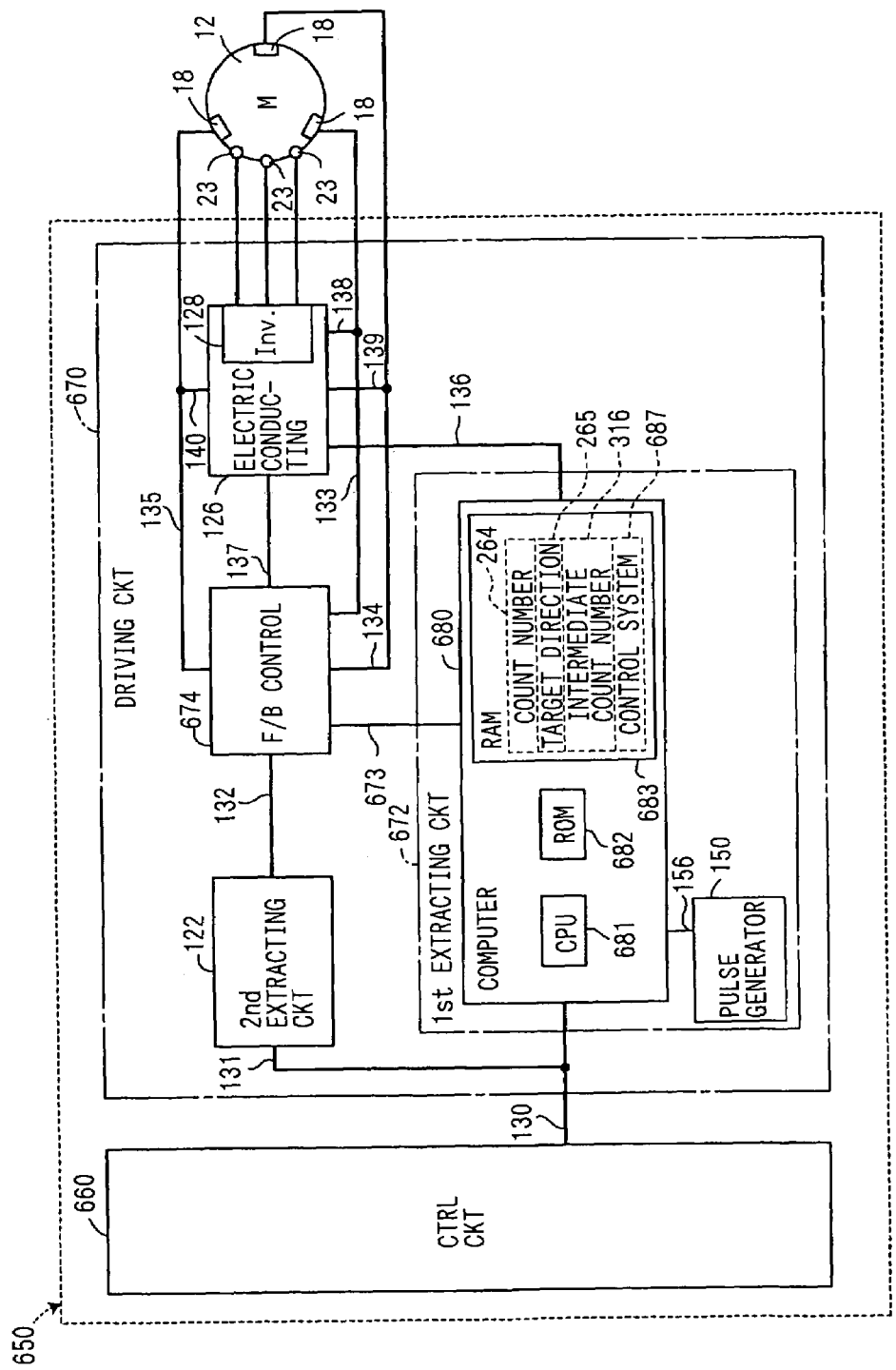
FIG. 32 is a block diagram showing a motor controller in accordance with an eleventh embodiment.
Figure 33A:
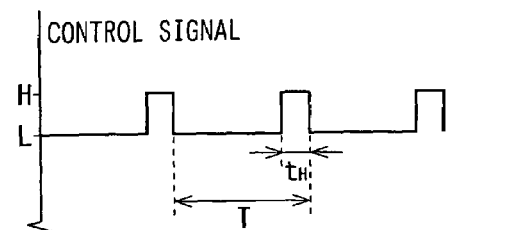
FIG. 33A to 33D are characteristic views for explaining a control signal generated in the eleventh embodiment.
Figure 33B:
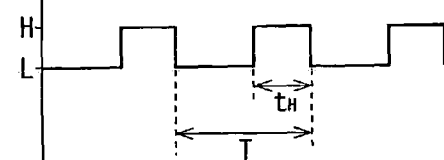
Figure 33C:
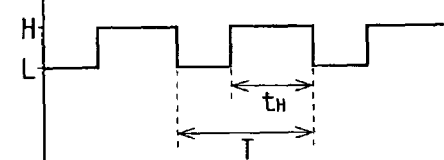
Figure 33D:
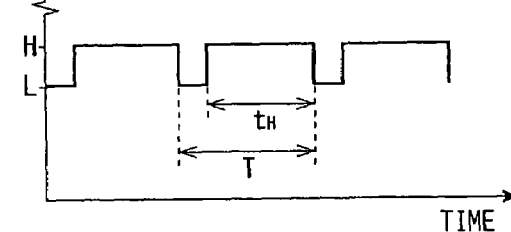

A motor controller in accordance with an eleventh embodiment of the invention is shown in FIG. 32. The eleventh embodiment is a modified example of the fourth embodiment. The same constructional portions as the fourth embodiment are designated by the same reference numerals and their explanations are omitted.

In the motor controller 650 of the eleventh embodiment, a control signal showing the target rotating direction D and other control information by the duty ratio is transmitted from a control circuit 660 to a driving circuit 670.

The control circuit 660 determines whether valve timing is changed or held on the basis of the rotation numbers of the crankshaft and the camshaft 11, etc. When the change of the valve timing is determined, the control circuit 660 selects the P-control as a control system (hereinafter, simply called a control system) executed by the driving circuit 670 to conform the real rotation number $S_r$ of the motor shaft 14 to the target rotation number S. In contrast to this, when the hold of the valve timing is determined, the control circuit 660 selects proportional and integral control (hereinafter, called PI control) as the control system.

The control circuit 660 generates a control signal combining the control system selected in this way with the target rotating direction D and showing the control system by the duty ratio. Concretely, as shown in FIG. 33, the duty ratio of the control signal is set to a first reference area $r_1$ when the target rotating direction D is the normal rotating direction and the control system is the P-control. The duty ratio of the control signal is set to a second reference area $r_2$ when the target rotating direction D is the normal rotating direction and the control system is the PI control. Further, the duty ratio of the control signal is set to a third reference area $r_3$ when the target rotating direction D is the reverse rotating direction and the control system is the P-control. The duty ratio of the control signal is set to a fourth reference area $r_4$ when the target rotating direction D is the reverse rotating direction and the control system is the PI control. In this embodiment, the respective reference areas $r_1$, $r_2$, $r_3$, $r_4$ can be set to values different from each other as long as reference areas $r_1$, $r_2$ are smaller than 50% and reference areas $r_3$, $r_4$ are greater than 50%. For example, the respective reference areas $r_1$, $r_2$, $r_3$ and $r_4$ are set to 20%, 40%, 60% and 80%. In this embodiment, the control signal shows the target rotation number S by its frequency.

As shown in FIG. 32, a computer section 680 of a first extracting section 672 in the driving circuit 670 is connected to a feedback control section 674 through a signal line 673. Here, the signal line 673 is a signal line for transmitting a third extracting signal described later from the computer section 680 to the feedback control section 674. Further, the computer section 680 differs from that of the fourth embodiment in an extraction-processing program stored to a ROM 682. The control system is stored to a fourth memory area 687 of a RAM 683 in the computer section 680 by this difference of the extraction-processing program.

Figure 34:
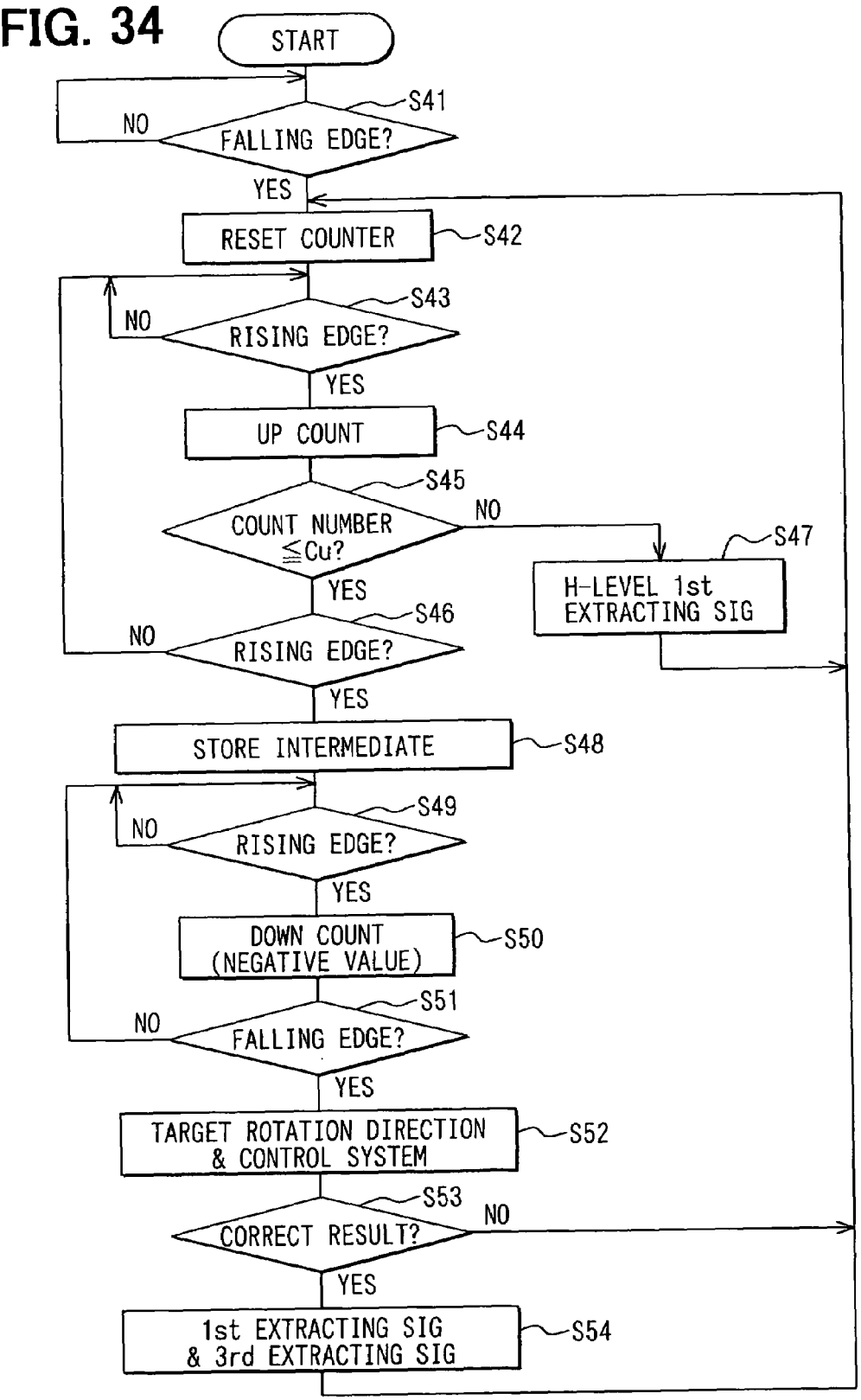
FIG. 34 is a flow chart for explaining the operation of a first extracting section in accordance with the eleventh embodiment.

The flow chart of FIG. 34 shows each step sequentially executed by executing the extraction-processing program of the eleventh embodiment by a CPU 681 of the computer section 680. First, steps S41 to S51 are executed similarly to steps S21 to S31 of the fourth embodiment.

In a step S52 transferred when a falling edge appears in the control signal in the step S51, it is determined whether the target rotating direction D is the normal rotating direction or the reverse rotating direction on the basis of the terminal count number $C_e$ of the first memory area 264 and the intermediate count number $C_m$ of the third memory area 316. In the step S52, it is also determined whether the control system is the P-control or the PI control on the basis of the terminal count number $C_e$ of the first memory area 264 and the intermediate count number $C_m$ of the third memory area 316. Hereinafter, the judgment processing of the step S52 will be explained concretely.

Similar to the fourth embodiment, in the eleventh embodiment, the duty ratio of the control signal can be shown by a formula $f_2$ in which the intermediate count number $C_m$ and the terminal count number $C_e$ shown by "○" and "●" in each of FIGS. 35C to 38C are set to variables.

As shown in FIG. 35, when the control signal shows the normal rotating direction and the P-control by the first reference area $r_1$, the intermediate count number $C_m$ and the terminal-count number $C_e$ respectively become positive values according to the first reference area $r_1$. Therefore, the value of the formula $f_2$ substantially conforms to the first reference area $r_1$. Here, "substantially conform" means that the value of the formula $f_2$ conforms to the first reference area $r_1$ within the range of an error $\pm\delta_1$. As shown in FIG. 36, when the control signal shows the normal rotating direction and the PI control by the second reference area $r_2$, the intermediate count number $C_m$ and the terminal count number $C_e$ respectively become positive values according to the second reference area $r_2$. Therefore, the value of the formula $f_2$ substantially conforms to the second reference area $r_2$. Here, "substantially conform" means that the value of the formula $f_2$ conforms to the second reference area $r_2$ within the range of an error $\pm\delta_2$.

As shown in FIG. 37, when the control signal shows the reverse rotating direction and the P-control by the third reference area $r_3$, the intermediate count number $C_m$ becomes a positive value according to the third reference area $r_3$ and the terminal count number $C_e$ becomes a negative value according to the third reference area $r_3$. Therefore, the value of the formula $f_2$ substantially conforms to the third reference area $r_3$. Here, "substantially conform" means that the value of the formula $f_2$ conforms to the third reference area $r_3$ within the range of an error $\pm\delta_3$. As shown in FIG. 38, when the control signal shows the reverse rotating direction and the PI control by the fourth reference area $r_4$, the intermediate count number $C_m$ becomes a positive value according to the fourth reference area $r_4$ and the terminal count number $C_e$ becomes a negative value according to the fourth reference area $r_4$. Therefore, the value of the formula $f_2$ substantially conforms to the fourth reference area $r_4$. Here, "substantially conform" means that the value of the formula $f_2$ conforms to the fourth reference area $r_4$ within the range of an error $\pm\delta_4$.

On the basis of the above knowledge, it is determined in the step S52 that the target rotating direction D is the normal rotating direction and the control system is the P-control when the value of the formula $f_2$ substantially conforms to the first reference area $r_1$. It is also determined that the target rotating direction D is the normal rotating direction and the control system is the PI control when the value of the formula $f_2$ substantially conforms to the second reference area $r_2$. Further, it is determined in the step S52 that the target rotating direction D is the reverse rotating direction and the control system is the P-control when the value of the formula $f_2$ substantially conforms to the third reference area $r_3$. It is also determined in the step S52 that the target rotating direction D is the reverse rotating direction and the control system is the PI control when the value of the formula $f_2$ substantially conforms to the fourth reference area $r_4$. Thus, in this embodiment, the first and second reference areas $r_1$, $r_2$ correspond to a first reference value, and the third and fourth reference areas $r_3$, $r_4$ correspond to a second reference value.

In the step S52, the determining results of the target rotating direction D and the control system are respectively stored to the second memory area 265 and the fourth memory area 687.

In a step S53 subsequent to the step S52, the determining results of the target rotating direction D and the control system in the step S52 of this time are compared with the past determining results in the step S52. It is then determined whether the determining results of this time are correct or not. With respect to this judgment processing, it is determined that the determining results of this time are correct when all the determining results of this time and past plural times are the same with respect to both the target rotating direction D and the control system. When it is determined that the determining results of this time are correct, the first extracting signal showing only the target rotating direction D among these determining results determined as the correct results and the third extracting signal showing only the control system among these determining results are generated in a step S54. Thereafter, it is then returned to the step S42. In contrast to this, when it is determined that the determining results of this time are not correct, it is returned to the step S42 without changing the first extracting signal and the third extracting signal.

In the eleventh embodiment, the first extracting signal and the third extracting signal showing the determining results of the step S52 as they are may be also generated in the step S54 without executing the step S53.

The feedback control section 674 receives the third extracting signal generated as mentioned above, and a command voltage $V_s$ for conforming the real rotation number $S_r$ of the motor shaft 14 to the target rotation number S is determined by the control system shown by this third extracting signal. In the driving circuit 670 for applying this command voltage $V_s$ to the motor 12 by the electric conducting section 126, the PI control is executed at a holding time of the valve timing. Accordingly, in accordance with the eleventh embodiment, the holding accuracy of the valve timing is improved.

Furthermore, in accordance with the eleventh embodiment, the target rotating direction D and the control system are determined on the basis of the judgment as to whether the value of the formula $f_2$ showing the duty ratio of the control signal substantially conforms to any one of the reference areas $r_1$, $r_2$, $r_3$, $r_4$. Accordingly, its judgment becomes accurate.

Further, in accordance with the eleventh embodiment, similar to the first embodiment, the improvement of adjustment accuracy of the valve timing and a reduction in cost can be reconciled, and a response speed is increased.

(Twelfth Embodiment)

Figure 39:
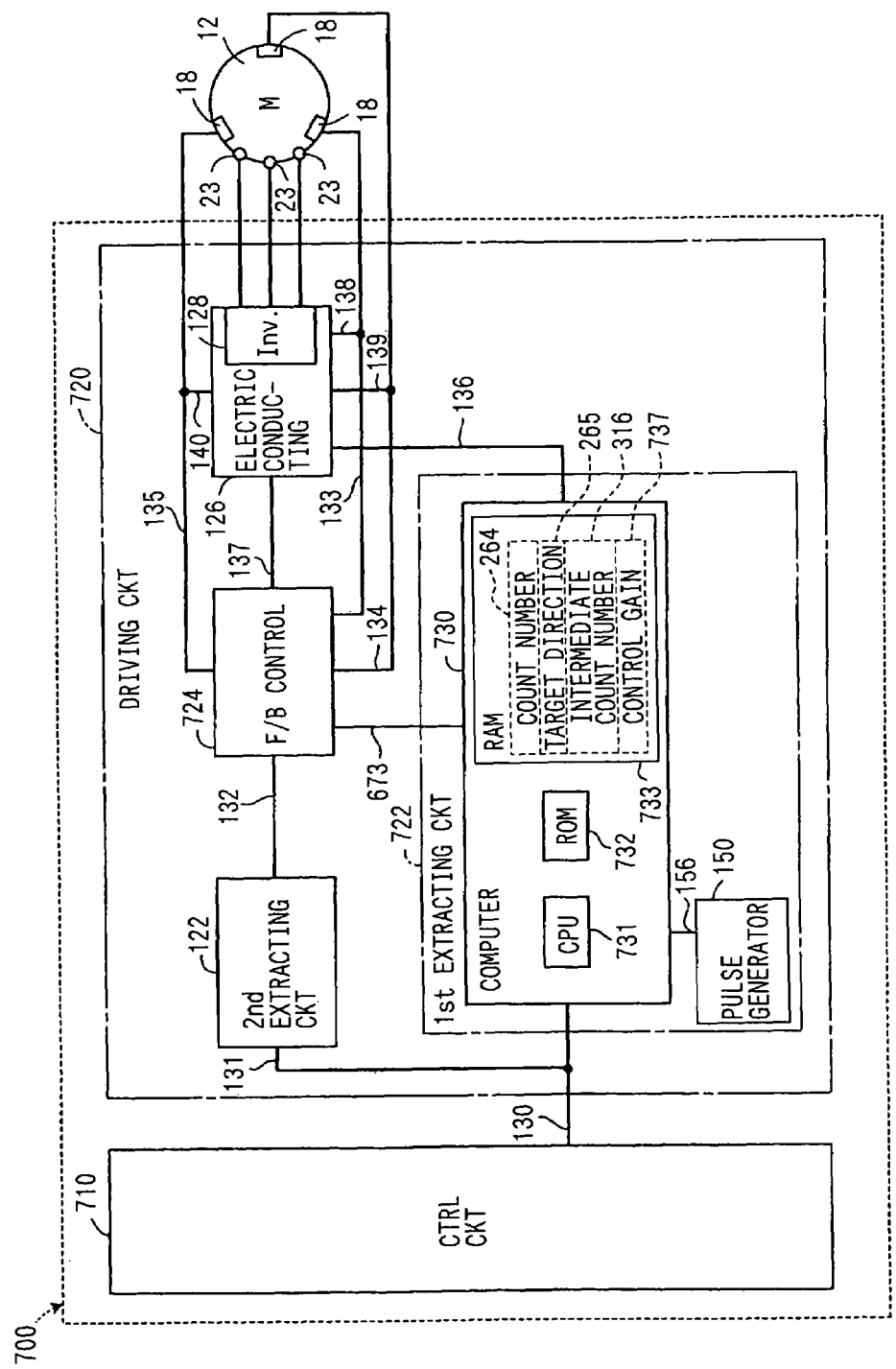
FIG. 39 is a block diagram showing a motor controller in accordance with a twelfth embodiment.
Figure 40A:
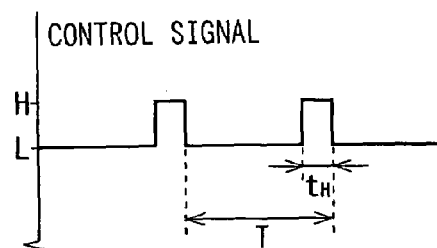
FIG. 40A to 40D are characteristic views for explaining a control signal generated in the twelfth embodiment.
Figure 40B:
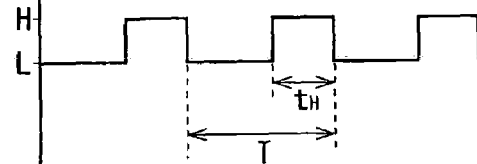
Figure 40C:
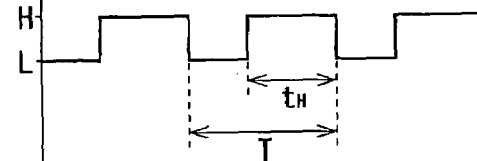
Figure 40D:
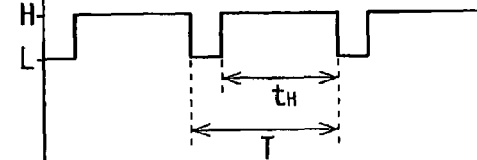

A motor controller in accordance with a twelfth embodiment of the invention is shown in FIG. 39. The twelfth embodiment is a modified example of the eleventh embodiment, and the same constructional portions as the eleventh embodiment are designated by the same reference numerals, and their explanations are omitted.

In the motor controller 700 of the twelfth embodiment, a control signal showing the target rotating direction D and other control information different from the control system by the duty ratio is transmitted from a control circuit 710 to a driving circuit 720.

The control circuit 710 determines whether the stability of a valve timing adjustment is importantly considered or responsibility is importantly considered on the basis of the operating situation of an engine, etc. When the important consideration of the stability is determined, the control circuit 710 sets the gain (hereinafter, called a control gain) of the P-control executed in the driving circuit 720 to a first gain $K_1$ so as to conform the real rotation number $S_r$ of the motor shaft 14 to the target rotation number S. In contrast to this, when the important consideration of the responsibility is determined, the control circuit 710 sets the control gain to a second gain $K_2$ greater than the first gain $K_1$.

The control circuit 710 generates a control signal combining the control gain set in this way with the target rotating direction D and showing the control gain by the duty ratio. Concretely, as shown in FIG. 40, the duty ratio of the control signal is set to a first reference area $r_1$ when the target rotating direction D is the normal rotating direction and the control gain is the first gain $K_1$. The duty ratio of the control signal is set to a second reference area $r_2$ when the target rotating direction D is the normal rotating direction and the control gain is the second gain $K_2$. The duty ratio of the control signal is set to a third reference area $r_3$ when the target rotating direction D is the reverse rotating direction and the control gain is the first gain $K_1$. The duty ratio of the control signal is set to a fourth reference area $r_4$ when the target rotating direction D is the reverse rotating direction and the control gain is the second gain $K_2$. In this embodiment, the respective reference areas $r_1$, $r_2$, $r_3$, $r_4$ are set in a large and small relation similar to that in the eleventh embodiment, and the control signal shows the target rotation number S by its frequency.

The driving circuit 720 shown in FIG. 39 is constructed similarly to the driving circuit 670 of the eleventh embodiment except for a computer section 730 of a first extracting section 722 and a feedback control section 724.

In the computer section 730 of the twelfth embodiment, the control gain is stored to a fourth memory area 737 of a RAM 733 by executing an extraction processing program stored to a ROM 732 by a CPU 731.

The flow chart of FIG. 41 shows each step sequentially executed by executing the extraction-processing program by the CPU 731. First, steps S61 to S71 are executed similarly to steps S41 to S51 of the eleventh embodiment.

Processing for respectively reading "control gain", "first gain $K_1$", "second gain $K_2$", and "fourth memory area 737" for "control system", "P-control", "PI control", and "fourth memory area 687" in steps S52, S53, S54 of the eleventh embodiment is executed in a step S72 transferred when a falling edge appears in the control signal in the step S71, and steps S73, S74 subsequent to this step S72.

The feedback control section 724 of the twelfth embodiment determines a command voltage $V_s$ for conforming the real rotation number $S_r$ of the motor shaft 14 to the target rotation number S by the P-control using the control gain shown by the third extracting signal. This command voltage $V_s$ is applied to the motor 12 by an electric conducting section 126. Therefore, when the control gain is set to the smaller first gain $K_1$, the change speed of a rotating phase is reduced. Accordingly, the stability of a valve timing adjustment is increased, or a convergent property to the target rotation number S is improved when a load is lightened as at a retardation operating time. In contrast to this, when the control gain is set to the greater second gain $K_2$, the change speed of the rotating phase is increased. Accordingly, the response speed is increased particularly at an angle advance operating time of the valve timing adjustment.

Furthermore, in accordance with the twelfth embodiment, the target rotating direction D and the control gain are determined on the basis of the judgment as to whether the value of the formula $f_2$ showing the duty ratio of the control signal substantially conforms to any one of the reference areas $r_1$, $r_2$, $r_3$, $r_4$. Accordingly, its judgment becomes accurate.

Moreover, in accordance with the twelfth embodiment, similar to the first embodiment, the improvement of adjustment accuracy of the valve timing and a reduction in cost can be reconciled and the response speed is increased.

The plural embodiments of the invention have been explained, but the invention is not limited and interpreted to these plural embodiments.

For example, the control system or the control gain is adopted in the eleventh and twelfth embodiments as control information shown together with the target rotating direction D by the duty ratio of the control signal. However, information except for the control system and the control gain may be also adopted. Further, a control signal showing both the control system and the control gain in combination with the target rotating direction D by the duty ratio may be also used. Further, a torque direction may be also determined by the duty ratio.

Furthermore, the characteristic constructions of the second to fourth embodiments, and the eleventh and twelfth embodiments may be also adopted in the fifth to tenth embodiments. When the characteristic constructions of the third, fourth, eleventh and twelfth embodiments are adopted in the fifth to tenth embodiments, the functions of the abnormality determining sections 362, 412, 462, 516, 562, 612 may be also realized by the computer sections 260, 310, 680, 730. Further, when the characteristic constructions of the third, fourth, eleventh and twelfth embodiments are adopted in the eighth to tenth embodiments, the function of the arithmetic section 512 may be also realized by the computer sections 260, 310, 680, 730.

Furthermore, in the explanation of the first to twelfth embodiments, the invention is applied to the valve timing-adjusting device as a valve opening-closing controller for adjusting the valve timing. However, the invention may be also applied to a valve opening-closing controller for adjusting a valve lift.

In addition, in the valve timing adjusting devices of the first to twelfth embodiments applying the invention thereto, the valve timing is changed to the retardation side when the motor 12 is relatively rotated in the normal rotating direction as the same rotating direction with respect to the sprocket 32 as a rotating body. The valve timing is changed to the angle advancing side when the motor 12 is relatively rotated in the reverse rotating direction with respect to the sprocket 32. The valve opening-closing controller applying the invention thereto may be also a valve timing adjusting device in which the valve timing is changed to the angle advancing side when the motor 12 is relatively rotated in the normal rotating direction as the same rotating direction with respect to the sprocket 32, and the valve timing is changed to the retardation side when the motor 12 is relatively rotated in the reverse rotating direction with respect to the sprocket 32.

What is claimed is:

1. A valve controller for controlling valve opening/closing of an engine by utilizing rotation torque of a motor, and comprising:
    a control circuit which generates a control signal which includes a frequency and a duty ratio, and
    a driving circuit which receives the control signal and applies an electric current to the motor to drive the motor based on a target rotation number of the motor represented by the frequency of the control signal, and based on a target rotating direction of the motor represented by the duty ratio of the control signal, the target rotation number of the motor varying according to the frequency of the control signal and the target rotating direction varying according to the duty ratio of the control signal.

2. The valve controller according to claim 1, wherein the driving circuit determines the normal/reverse rotating directions of the target rotating direction of the motor based on a difference between the duty ratio of the control signal and a reference value.

3. The valve controller according to claim 1, wherein the driving circuit determines that the target rotating direction of the motor is the normal rotating direction when the duty ratio of the control signal substantially conforms to a first reference area, and also at the target rotating direction of the motor is the reverse rotating direction when the duty ratio of the control signal substantially conforms to a second reference area different from the first reference area.

4. The valve controller according to claims 1, wherein the valve controller adjusts a valve timing of the engine.

5. The valve controller according to claim 4, further comprising
    a rotating body rotated in synchronization with the engine, wherein
    the valve timing of the engine is changed when the motor is relatively rotated in the same normal rotating direction as the rotating body or when the motor is relatively rotated in the reverse rotating direction reverse to this normal rotating direction with respect to the rotating body.

6. The valve controller according to claim 5, wherein the duty ratio of the control signal representing the normal rotating direction as the target rotating direction of the motor is smaller than the duty ratio of the control signal representing the reverse rotating direction as the target rotating direction of the motor.

7. The valve controller according to claim 5, wherein the driving circuit compulsorily sets the target rotating direction of the motor to the normal rotating direction when the target rotation number of the motor represented by the control signal is more than or equal to a threshold value.

8. The valve controller according to claim 7, wherein the driving circuit transmits an abnormality signal showing an abnormality to the control circuit when the target rotation number of the motor represented by the control signal is more than or equal to the threshold value and the target rotating direction of the motor represented by the control signal is the reverse rotating direction.

9. The valve controller according to claim 7, wherein the threshold value is set to be greater than a maximum rotation number of the reverse rotating direction set to the motor and smaller than a maximum rotation number of the normal rotating direction set to the motor.

10. The valve controller according to claim 5, wherein the driving circuit compulsorily stops the electric conduction to the motor when the target rotation number of the motor represented by the control signal is more than or equal to a threshold value and the target rotating direction of the motor represented by the control signal is the reverse rotating direction.

11. The valve controller according to claim 5, wherein the driving circuit compulsorily sets the target rotating direction of the motor to the normal rotating direction when the real rotation number of the motor is more than or equal to a threshold value.

12. The valve controller according to claim 11, wherein the driving circuit transmits an abnormality signal showing an abnormality to the control circuit when the real rotation number of the motor is more than or equal to the threshold value and the target rotating direction of the motor represented by the control signal is the reverse rotating direction.

13. The valve controller according to claim 5, wherein the driving circuit compulsorily stops the electric conduction to the motor when the real rotation number of the motor is more than or equal to a threshold value and the target rotating direction of the motor represented by the control signal is the reverse rotating direction.

14. The valve controller according to claim 1, wherein the valve controller adjusts a valve lift of the engine.

15. The valve controller according to claim 1, wherein the control circuit controls the operation of the engine.

16. A method of controlling an opening/closing of a valve of an engine by utilizing rotation torque of a motor, the method comprising:
generating a control signal which includes a frequency and a duty ratio; and
generating and applying an electric current to the motor to drive the motor, the electric current applied to the motor being generated based on (i) a target rotation number of the motor represented by the frequency of the control signal and (ii) a target rotating direction of the motor represented by the duty ratio of the control signal;
wherein the target rotation number varies according to the frequency of the control signal and the target rotating direction varies according to the duty ratio of the control signal.

17. The method according to claim 16, wherein normal/reverse rotating directions of the target rotating direction of the motor is determined based on a difference between the duty ratio of the control signal and a reference value.

18. The method according to claim 16, wherein the target rotating direction of the motor is determined as a normal rotating direction when the duty ratio of the control signal substantially conforms to a first reference area, and the target rotating direction of the motor is determined as a reverse rotating direction when the duty ratio of the control signal substantially conforms to a second reference area different from the first reference area.

19. The method according to claim 16, further comprising:
rotating a rotating body in synchronization with the engine,
wherein a valve timing of the engine is changed when the motor is relatively rotated in a same normal rotating direction as the rotating body or when the motor is relatively rotated in a reverse rotating direction reverse to this normal rotating direction with respect to the rotating body.

20. The method according to claim 19, wherein the duty ratio of the control signal representing the normal rotating direction as the target rotating direction of the motor is smaller than the duty ratio of the control signal representing the reverse rotating direction as the target rotating direction of the motor.

21. The method according to claim 19, wherein the target rotating direction of the motor is compulsorily set to the normal rotating direction when the target rotation number of the motor represented by the control signal is more than or equal to a threshold value.

22. The method according to claim 21, further comprising generating an abnormality signal when the target rotation number of the motor represented by the control signal is more than or equal to the threshold value and the target rotating direction of the motor represented by the control signal is the reverse rotating direction.

23. The method according to claim 19, wherein the electric current to the motor is compulsorily stopped when the target rotation number of the motor represented by the control signal is more than or equal to a threshold value and the target rotating direction of the motor represented by the control signal is the reverse rotating direction.

24. The method according to claim 19, wherein the target rotating direction of the motor is compulsorily set to the normal rotating direction when the real rotation number of the motor is more than or equal to a threshold value.

25. The method according to claim 24, further comprising generating an abnormality signal when the real rotation number of the motor is more than or equal to the threshold value and the target rotating direction of the motor represented by the control signal is the reverse rotating direction.

26. The method according to claim 19, wherein electric current to the motor is compulsorily stopped when the real rotation number of the motor is more than or equal to a threshold value and the target rotating direction of the motor represented by the control signal is the reverse rotating direction.

27. The method according to claim 21, wherein the threshold value is set to be greater than a maximum rotation number of the reverse rotating direction set to the motor and smaller than a maximum rotation number of the normal rotating direction set to the motor.

* * * * *